United States Patent [19]

Morton

[11] 4,051,458

[45] Sept. 27, 1977

[54] VIDEO AMPLITUDE RELATED MEASUREMENTS IN IMAGE ANALYSIS

[75] Inventor: Roger R. Morton, Penfield, N.Y.

[73] Assignee: Bausch & Lomb Incorporated, Rochester, N.Y.

[21] Appl. No.: 689,217

[22] Filed: May 24, 1976

[51] Int. Cl.$^2$ .............................................. G06K 9/00
[52] U.S. Cl. .................... 340/146.3 AG; 340/146.3 H
[58] Field of Search ......... 235/92 PC, 92 PL, 92 DP, 235/92 V; 340/146.3 AG, 146.3 AH, 146.3 T, 146.3 H, 172.5

[56] References Cited

U.S. PATENT DOCUMENTS

| | | | |
|---|---|---|---|
| 3,675,209 | 7/1972 | Trost et al. | 340/172.5 |
| 3,697,956 | 10/1972 | Goldman et al. | 340/172.5 |
| 3,723,970 | 3/1973 | Stoller | 340/146.3 AG |
| 3,878,323 | 4/1975 | Fisher | 235/92 PC |
| 3,895,358 | 7/1975 | Pearl | 340/172.5 |

*Primary Examiner*—Joseph M. Thesz
*Attorney, Agent, or Firm*—Frank C. Parker; Bernard D. Bogdon

[57] ABSTRACT

Image analysis techniques permit the measurement of a wide variety of parameters of the image being analyzed. This invention is specifically concerned with the measurement of parameters related to the amplitude of the video signal. Measurement related parameters include density, absorbance, transmittance, and reflectance of a particular sample. Techniques employed analyze the amplitude of a video signal over a predefined area and process this on a point-by-point basis to produce the desired measurement with exceptional accuracy.

21 Claims, 22 Drawing Figures

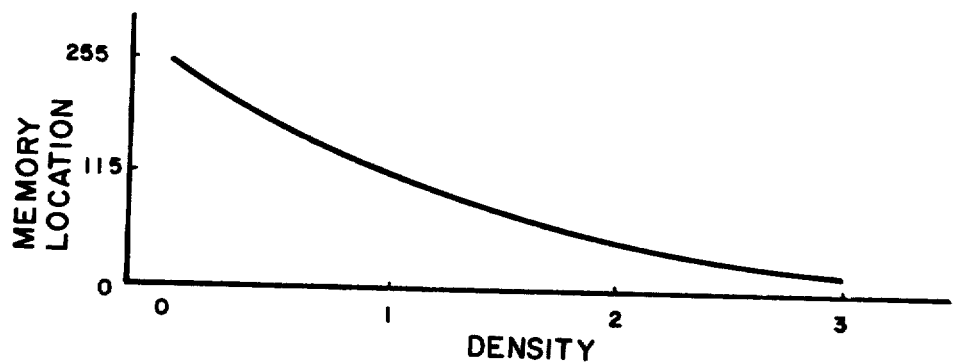
FIG. 4
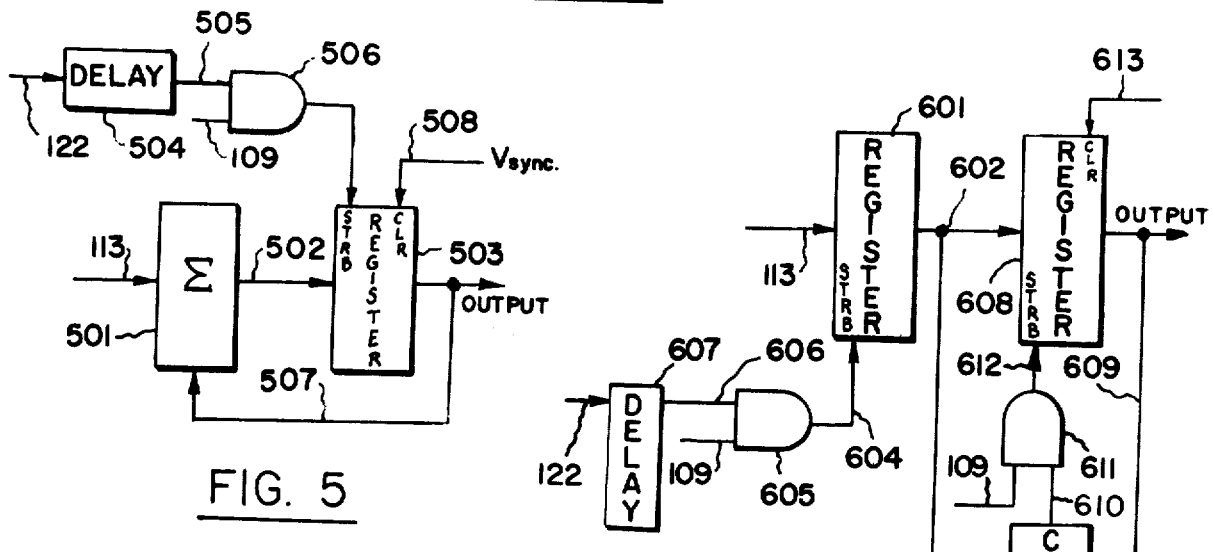
FIG. 5
FIG. 6
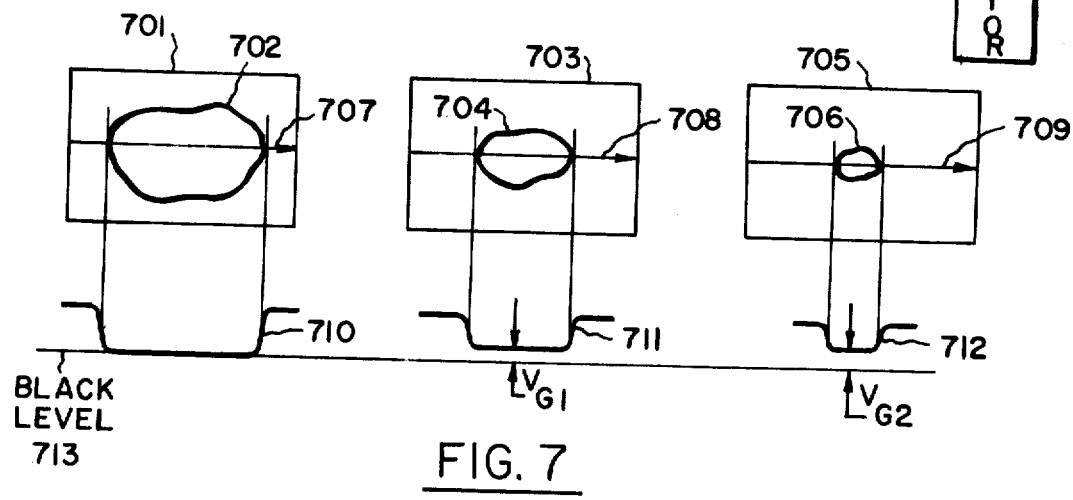
FIG. 7

| FIELD NUMBER | | A/D WORD GENERATOR GENERATES | | | | | | | |
|---|---|---|---|---|---|---|---|---|---|
| | BIT NUMBER → | 8 | 7 | 6 | 5 | 4 | 3 | 2 | 1 0 |
| 1 | ZERO NUMBER | 0 | 0 | 0 | 0 | 0 | 0 | 0 | 0 0 |
| 2 | | 1 | 0 | 0 | 0 | 0 | 0 | 0 | 0 0 |
| 3 | | X | 1 | 0 | 0 | 0 | 0 | 0 | 0 0 |
| 4 | | X | X | 1 | 0 | 0 | 0 | 0 | 0 0 |
| 5 | | X | X | X | 1 | 0 | 0 | 0 | 0 0 |
| 6 | | X | X | X | X | 1 | 0 | 0 | 0 0 |
| 7 | | X | X | X | X | X | 1 | 0 | 0 0 |
| 8 | | X | X | X | X | X | X | 1 | 0 0 |
| 9 | | X | X | X | X | X | X | X | 1 0 |
| 10 | | X | X | X | X | X | X | X | X 1 |
| 11 | | 0 | 0 | 0 | 0 | 0 | 0 | 0 | 0 Y |
| 12 | | X | X | X | X | X | X | X | X X |
| 13 | | 0 | 0 | 0 | 0 | 0 | 0 | 0 | 0 Y |
| 14 | | X | X | X | X | X | X | X | X X |
| 15-26 | | | | | | | | | |

Y = 0 ; X = 1   IF MEMORY IS TO BE DECREASED
Y = 1 ; X = 0   IF MEMORY IS TO BE INCREASED

VIDEO AMPLITUDE RELATED MEASUREMENTS IN IMAGE ANALYSIS

BACKGROUND OF THE INVENTION

Image analysis is concerned with extracting data from images using electronic techniques. Some of these techniques have been described in detail in the R. A. Morton U.S. Pat. No. 3,805,028. That patent is concerned primarily with extracting information relating to various measurements of geometric size of features or objects in the field of view.

In this disclosure, the objects to be measured, generically termed features, which may correspond to particles, lakes, cells, islands, or other objects depending on the image being analyzed, are processed to determine the value of parameters relating to density, transmittance, absorbance, and reflectance. These measurements are generally unrelated to size, but are related to the intensity, or brightness, or darkness of the feature. These intensity related measurements are derived from the amplitude of the video signal generated by the television camera or scanner which scans the image traversing the features of interest.

In order to get a complete and detailed characterization of a specific object not only are its size, shape and other geometric measures of importance, but also a characterization of its intensity or gray level is important, for often it contains significant information to be further used, for example, to determine measurements relating to volume of particles and cells composed of semi-transparent material.

The magnitude of these amplitude related measurements is influenced by how the object is imaged, whether using, for example, transmitted or reflected light. Also, the spectral characteristics of the illumination, as well as the spectral characteristics of the pickup tube of the television scanner which scans the image of the object, and the angles of illumination of the object, as well as the angles at which light is rceived from the object, all have an effect on the measurement obtained and must therefore be taken into account in performing the measurement. For example, a partially opaque object when viewed in transmitted light has an integrated density which is related to its specific optical density value through Beer's law which states that the density of each point of an object is proportional to its specific optical density times its thickness. Similarly, the reflectance of an object when viewed in incident light can under appropriate conditions be related back to the complex refractive index of that object.

In order to perform measurements based on the magnitudes of video amplitudes it is first necessary to scan the object to obtain video signals representing the object and its field. This important proces produces a video signal having a number of limiting characteristics which, if not corrected for, can introduce significant errors into the final result. The first of these characteristics is the possible nonlinear relationship between the amplitude of the video signal and the intensity of the observed image. For example, although a Plumbicon ® pickup tube produces a linear response of output signal with light intensity, the vidicon scanner tube does not. The vidicon scanner, on the other hand, exhibit a greater sensitivity in the dark end of the video range and can, therefore, provide a wider dynamic range than the Plumbicon ® tube.

In deriving meaningful measures of density, transmittance or reflectance from the video signal, the relationship between the video amplitude response of the scanner and image intensity must be taken into account directly or indirectly. This invention provides a way to accommodate for the variation between different scanner tubes and simultaneously accommodate for the fact that density measurements, for example, vary in a different way with the video amplitude than do transmittance measurements, by using a memory to store the overall functional relationship between the video signals and required measurement, whether it be, for example, density or transmittance. This overall functional relationship takes into account the linearity characteristics of a pickup tube as well as the sensitivity characteristics of the optical system and illumination. Because different pickup tubes may be used and different measurements (e.g., density or absorbance or transmittance) may be measured using the same system, it is desirable to be able to change this functional relationship to suit the desired measurement and the available scanning tube.

SUMMARY OF THE INVENTION

In this invention, the analog video signal from the scanner is digitized at numerous specific points along the scan line using an analog-to-digital converter to produce a parallel digital output signal which is used to select word locations in a random access memory whose addresses correspond to the output of the A to D converter. Each of the addressed locations in the random access memory contains a binary value, such that the binary value at a specific address location is a function of the type of measurement desired and, for example, the pickup tube characteristics. Thus, digital values are obtained from the memory on a point-by-point basis in the desired units, for example, in units for density or transmittance, taking into account the sources of amplitude nonlinearities.

The functional relationship stored in memory may be derived from a larger memory which stores various sets of functional relationships corresponding to the various types of measurement to be performed, experimentally or theoretically computed at the time the instrument was designed.

Alternatively, the desired function may be obtained experimentially using closed loop techniques. Thus, for example, it is possible to insert in the field of view of the television scanner reference samples which generally are uniform and cover a whole field of view and which have different known densities. Measurements of the amplitude of the signal resulting from each of these reference samples are then obtained as an output from the analog to digital converter. Each output representing such reference sample corresponds to a specific address in memory which memory must be loaded with the value of the known density of the reference sample. Intermediate values for loading into addresses, which lie between the values at the output of the A to D converter for specific values of the reference sample, may be determined by calculation using interpolation techniques of the known sample densities.

Thus, a relationship is experimentally derived between these various video amplitudes to the known densities. The memory used to permanently store this function may be a non-volatile random access memory, an appropriately programmed read-only-memory (ROM) or a programmable read-only-memory (PROM)

programmed using a programmer such as available from Technitrol, Inc. of Philadelphia, Pennsylvania.

Once a point-by-point output of digital format of the density, transmittance, reflectance or absorbance of a sample is obtained, the data can be processed to produce integrated density or transmittance, to determine peak or maximum or minimum density or transmittance and so on. This processing can be done using the conventional arithmetic techniques of digital electronics. Integrated density can relate to the volume of certain semi-transparent particles or cells. Integrated transmittance can be used to determine the average transmittance of an object. Maximum density can be used to obtain the value of the most dense area of a feature and correspondingly minimum density can be used to obtain the lightest area of a feature while the difference between the maximum and minimum values corresponds to the range of density across a sample.

The area of scan, over which data processing takes place, is determined by a data processing controlling signal. Data processing can take place over individual features to produce specific feature data. Over all features in the field of view to produce entire field feature measurements, over the entire field of view including features and their background to produce entire field measurements. Data may be produced from individual features by measuring one feature at a time by using, for example, a light pen as disclosed, for example, in R. A. Morton U.S Pat. No. 3,805,028. Data may also be obtained individually on all features within the field of view. In both these cases, data processing operation occurs only when a feature is being scanned.

Determination of when a feature is being scanned is made by detection circuitry which, for example, is described in R. A. Morton U.S. Pat. No. 3,763,357. When measuring one feature at a time, a data processing controlling signal may correspond to the binary video of the selected feature. Alternatively, when performing an intensity related measurement over the entire field, including both the features and the background, the data processing controlling signal will correspond to the signal which defines the field of measurement.

A variety of measurements may be obtained using either density, transmittance, reflectance, or absorbance output of the random access memory. Data from the random access memory may be processed in various ways. For example, it may be summated to produce an integrated measurement; the maximum value may be determined; the minimum value may be determined; or data can be selected to generate a further binary video signal which may be added back into the display video to produce white and dark areas on the display corresponding to equi-density clock on a CRT display. U.S. Pat. No. 3,805,028 shows means for generating a display video as a combination of the various video signals generated during the measurement operation and the video signal derived from the television camera.

The combination of the various types of intensity related data which are available from the memory, and the various types of data processing which may be performed either on individual features, over features in the field of view, or over the entire field of measurement, produces a wide range of measurement possibilities, each having a variety of applications.

Because of the significance of the black level of a sample, especially when measuring density, it is important to compensate for any deviations of black level which may arise from imperfections in the optics. One of these major deviations is due to variation in black level arising from glare added to the image. This glare is related to the brightness or percentage of white of the sample. Thus, in a sample having a small amount of black and a large amount of white, it will be observed that the small black area appears to be a dark gray because of the glare or stray light arising in the optics. On a sample which is substantially black, however, because of the small amount of light when the sample will allow to pass through, the effective glare on the black levels is not as noticeable. This effect of sample dependent glare is corrected for by determining the amount of white or light area within the sample and inserting an additive correction into the video signal, based on a measure of the amount of white in the sample multiplied by an experimentally derived glare correction factor.

This glare correction technique takes into account the glare contribution of the optics and provides a first order correction for gray characteristics in the sample, as well. The experimental determination of the glare correction factor must be repeated for different objectives and different illumination techniques, because the amount of glare introduced by the optics is a function of both these variables.

In addition to the sample dependent glare, whose level varies as a function of the amount of white in the sample or overall reflectance or transmittance of the sample, glare which is simple-independent also occurs. This glare is most predominant when using incident illumination where, even with a sample of zero reflectance, the image is not totally black. This glare results in a sample-independent offset of the overall brightness of the video signal, generating an overall voltage offset of the video signal. Other offsets which may occur in the video signal result from dark current of the scanner tube. Minor offsets may also be due to various electronic artifacts.

The total offset may be non-uniform across the field of view, and it may be corrected as follows. A sample which has a low reflectance or high density, depending on whether transmitted or reflected light is being used, is placed in the optical path. A reference video signal results, which may be stored and used as a reference to correct the video signal which is generated when the actual sample is being imaged, for variations in the level of the video signal due to glare and offsets. The reference video signal is stored for the complete field of view, and this stored reference data is used to correct for offsets in the video signal which may occur when analyzing the actual sample.

Another source of distortion of the video signal has its origin in the variations in illumination, variations in vignetting, and variations in sensitivity of the scanner tube. These variations affect the white level more than they affect the black level of the video signal and contribute a multiplicative factor to the overall video. The correction of these components is implemented by inserting a low density or high reflectance sample, depending on whether transmitted or reflected light is being used, and storing the resulting video signal to generate a multiplicative correction signal to correct the video signal from the actual sample being analyzed.

In a complete system the following sequence of events is incorporated. First, the sample is illuminated in a manner consistent with the desired video amplitude-related measurements. As already mentioned, this may be a function both of angle of illumination, direction of illumination, and spectral content of the illuminating light. An image is then formed from the illustrated sample and is passed to the television camera or scanner to generate a video signal. This video signal can be first corrected for shading of both the offset and multiplicative type. One benefit of this correction is that the video signal levels are established not only with the shading and glare components removed, but also the levels are established and amplitudes fixed with respect to the reference samples used to generate the stored reference signals.

Thus, the video signal, with its amplitudes established by a reference specimen and with correction made for shading, next passes to a glare-correction circuit to remove the sample dependent glare as already discussed. The resulting signal is then converted into a digital format using an analog-to-digital converter. The resulting digital signal is used to generate a second digital signal whose value corresponds to the desired measurement.

Generation of the second digital signal is performed, as already discussed, using random access memory in a look-up table configuration, where the resulting functions on which the look-up table is based are either experimentally derived or built into the system when it is manufactured. From this point, deriving the desired density, transmittance, reflectance, or absorbance-related measurements can be accomplished by using summation, comparison or other established data processing techniques.

BRIEF DESCRIPTION OF THE DRAWINGS

FIG. 4 is a plot of memory location versus density;

FIG. 5 is a diagram of an arithmetic unit for summing the density value of the features in a field of view;

FIG. 6 is another arithmetic unit which determines the peak density of a feature or group of features;

FIG. 7 is an illustration of the effect of glare on uncorrected information signals;

DETAILED DESCRIPTON OF PREFERRED EMBODIMENTS

Basic System

Figure 1:
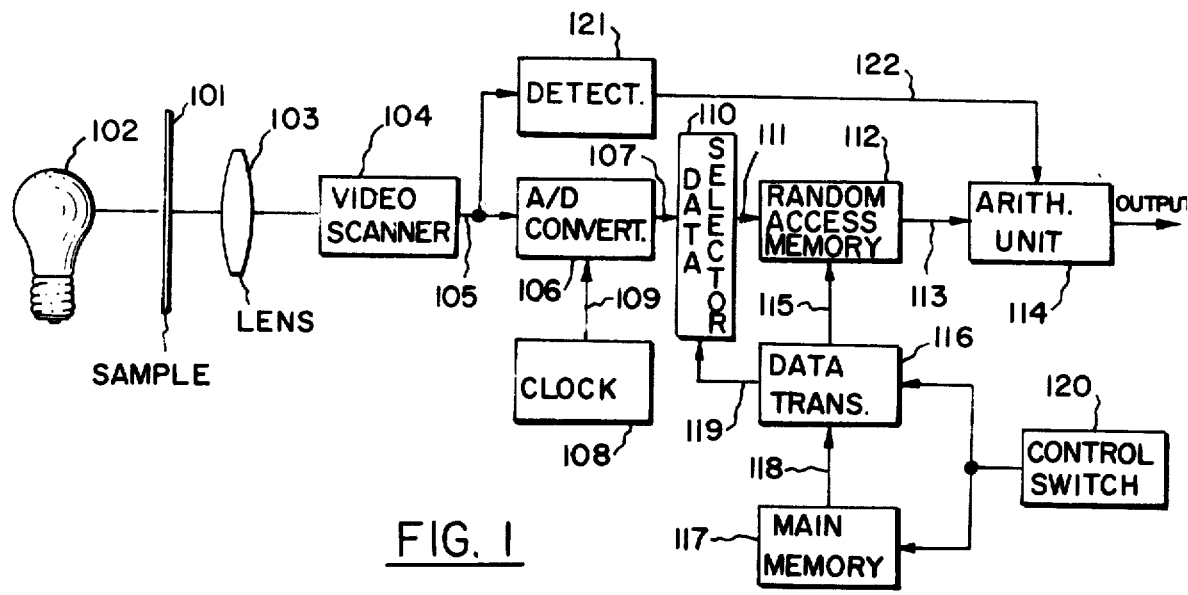
FIG. 1 is a block diagram of a preferred system made in accordance with the invention.

As shown in FIG. 1, sample 101 is illuminated by light source 102 in either a transmitted or reflected mode, depending on the desired measurement. In the transmitted mode, measurements such as density or absorbance may be performed, while in the incident mode measurements such as reflectance may be performed. In determining which specific measurement is being performed, it is often necessary to specifically define the spatial characteristics of the illumination, the angle of illumination, and the angle over which light is collected.

Figure 2:
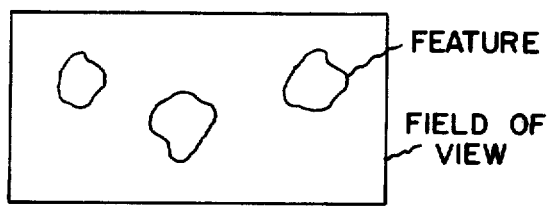
FIG. 2 shows a field of view having three features whose density or related optical characteristics are to be determined.

Sample 101, illuminated by lamp 102, is imaged by lens 103 to pass an image to a video scanner 104 to produce on a line 105, as a result of parallel scan of the image formed by lens 103, a video signal whose instantaneous amplitude is related to the intensity variation of the image along scan lines across the image which is being scanned. Generally, as shown in FIG. 2, the objects being imaged have discrete boundaries. The objects are generically referred to as features. Thus, there is provided a means for scanning a field containing a feature or features to produce a video signal having analog values representative of an optical characteristics of the feature or features. Details of exemplary apparatus and methods to accomplish these procedures are disclosed in beforementioned U.S. Pat. No. 3,805,028 and U.S. Pat. No. 3,763,357.

Figure 3:
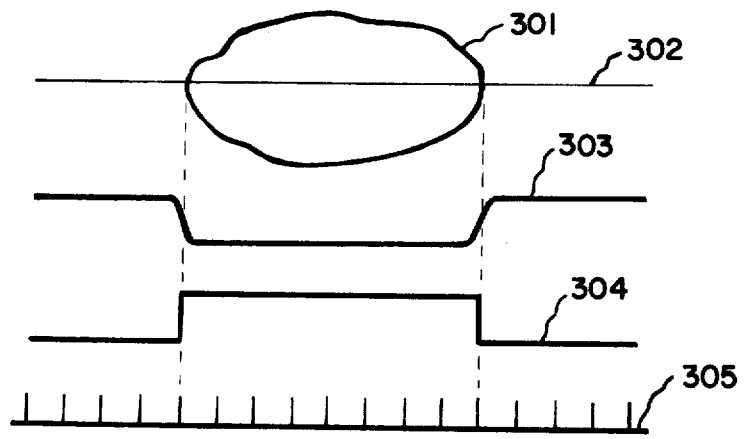
FIG. 3 is a diagram showing various waveforms.

Means are provided for converting the foregoing video signal at discrete points along a line scan to digital data having values corresponding to the amplitude values of the video signal at such points. Thus, the video signal on line 105 passes to analog-to-digital (A to D) converter 106 which produces at its output 107, digital signals corresponding to the video signal amplitude at specific points along each of the scan lines. These points are defined by a clock 108 passing clocking pulses along line 109 to the A to D converter 106, as hereinafter explained with respect to FIG. 3. The data on line 107 passes through data selector 110. The data selector 110, for example, can be Texas Instruments integrated circuit SN74S157, and functions to pass to line 111 to data on line 107 where the digital data from the A to D converter 106 is used as the address of random access memory 112.

Random access memory 112 is in the read mode as controlled by data transfer 116 at times except when being loaded. Consequently, when random access memory 112 is in the read mode, the input data on line 111 produces output data on output line 113 of memory 112 which was previously loaded, as hereinafter explained, and which output corresponds to the contents of the memory cells or locations addressed by the data on line 111.

The analog-to-digital converter 106 can be constructed as taught in the book "Analog-to-Digital/Digital to Analog Conversion Techniques", by David F. Hoeschele, Jr., John Wiley & Sons, Inc., 1968 as specifically set forth in pages 355 et seq. Random access memory 112 may be constructed from a variety of available integrated circuits including, for example, Texas Instruments integrated circuit SN74S189. The data on line 113 next passes to an arithmetic unit 114 which processes the data, for example, to summate or compare in order to produce a maximum or minimum reading of the data passing in on line 113 to generate the hereinbefore mentioned results related, for example, to integrated density or transmittance, maximum or minimum density or transmittance.

Prior to a specific measurement being performed, data, corresponding to a functional relationship stored in the main memory which is applicable to the specific type of measurement to be performed, is loaded into random access memory 112 through line 115 via data transfer circuitry 116 which receives the data from main memory 117. This data, together with its address, passes on line 118 to the transfer circuit 116 which generates address information on line 119, which passes through data selector 110 and line 111 to memory 112. This data transfer technique between memories can take many forms and is well known in the art. See for example "Digital Computer Fundamentals", Thomas C. Bartee, McGraw-Hill, 1972, pp. 245-320, or "The Semiconductor Memory Data Book", Texas Instruments, Inc.

Selection of the block of data to define the specific type of intensity related measurement to be performed and which is to be loaded into memory 112, is determined by the operator through control switch 120. One of a number of blocks of data stored in memory 117 may be loaded into memory 112, and the block of data loaded determines in part whether the system will measure, for example, transmittance or absorbance.

Detector block 121 is used to detect the boundaries of features whose density it is desired to measure. Such a detection process has been described in some detail in U.S. Pat. 3,805,028 and involves the process of deriving from the video signal the boundaries of the features to be measured. This results in a binary video signal being present on line 122 which is used to control the summation or other arithmetic operation being performed in block 114. Alternatively, the signal on line 122 may correspond to the frame when the processing is to take place over both features and background within the frame.

Let us now consider in detail the function of the block diagram shown in FIG. 1 when measuring total density of detected features in the field of view. In response to a single feature 301 shown in FIG. 3 being scanned by scan line 302, there appears on line 105 a video signal as shown by waveform 303, in this case corresponding to a dark feature being viewed in transmitted light and therefore being represented on a white background. Due to detector 121, this signal results in a binary video signal which is represented by waveform 304 appearing on line 122.

At points along the scan line defined by clock pulse generator 108 generating clock pulses on line 109, as represented by the pulses on line 305, the A to D converter 106 converts the amplitude of the analog signal on line 105, represented by waveform 303, into a digital format which appears on parallel digital lines represented by line 107 in FIG. 1. For convenience of illustration, the extremities of the features 301 typically coincide with clock pulses on line 305. This parallel digital data on line 107 passes through data selector 110 and on through line 111 to address the contents of memory 112.

The conversion performed by A to D converter 106 may, for example, be into one of 256 levels in a range from 0 to 255 and represented in a binary format by the state of 8 parallel data lines represented by line 107. In this case, the data would correspond to one of 256 possible locations in memory 112, which would be address as determined by the output from A to D converter 106.

As previously mentioned, the data loaded into random access memory 112 from main memory 117 determines the type of measurement to be made. If a density measurement is being made, and assuming that the lowest value address corresponds to the white level, data would be loaded into memory 112 which would correspond to the curve shown in FIG. 4. On the vertical axis is plotted memory location, for example, from 0 to 255, and on the horizontal axis is plotted the output of the random access memory in density units. Thus, for example, memory location 115 may correspond to a density of 1.0. The exact shape of this curve is determined by a number of factors. The first, as already mentioned, is the measurement to be performed, whether it be density, transmittance, absorbance, or other measure. But other secondary factors also influence the shape of the curve. These include the response of the scanner 104 to light intensity. This response is determined by the type of scanner tube used. For example, a Plumbicon ® tube will produce a linear response to light intensity, while a vidicon will prduce a response which is non-linear with light intensity. Thus, these responses must be taken into account when defining the relationship between the output of the A to D converter 106 and the density which that level represents. The most elementary way to define this relationship is to calculate, at design time, the response characteristic and load this characteristic into memory 117. Memory 117 may, for example, be programmable read-only-memory (PROM) loaded with the appropriate curves at the time the instrument is manufactured. An example of an available programmable read-only-memory includes Texas Instrument part number SN74S287.

Thus, the output of memory 112 on line 113 corresponds at each clock pulse to the measured intensity related parameter of the sample corresponding to the position of the scanning spot in relation to that clock pulse. This data is passed to the arithmetic unit 114 for the summing configuration shown in greater detail in FIG. 5. The binary video signal enters on line 122 from detection circuit 121. This signal defines the boundaries of the features or particles whose integrated density is to be determined. The signal first passes through a delay 504 which delays the signal to match the delay required. This delay is a function of delays through A to D converter 106, data selector 110, random access memory 112 and detector 121. The video signal is converted by the A to D converter 106 and passed to the random access memory 112. The output of the delay on line 505 is combined in AND gate 506 with a clock pulse on line 109, and the resulting clock pulse passes, for example, into a 20-bit wide register 503 constructed, for example, from Texas Instruments integrated circuits SN74S715. This 20-bit wide register has data inputs on line 502 from summer 501, for example Texas Instruments SN74283, which receives on line 113 the output from random access memory 112.

Whenever a clock pulse occurs, the output of the summer 501 corresponding to the data on line 113, plus the data on line 507 corresponding to the contents of registers 503, which contents appears on line 502, is strobed into the registers 503 so that a new partial sum is formed. This summation continues on every resulting clock pulse as data is generated by the A to D converter 106 and random access memory 112 combination. Thus, at the end of a complete field of view, there resides in register 503 the summation of all density values occurring on detected features across the field of view. This value corresponds to integrated density. Line 508 from scanner 104 resets or zeroes the contents of register 503 at the beginning of each field of view.

An alternative function which may be performed by the arithmetic unit 114 is that of determining the peak density or transmittance of a single feature or a group of features. A block diagram of a peak density determining circuit is shown in FIG. 6. Data from the random access memory 112 enters on line 113 to register 601. The loading register 601 is controlled through strobe line 604. The strobe or load line 604 is driven by gate 605 which strobes the contents of random access memory 112 on line 113, whenever a clock pulse occurs on line 109 from clock generator 108, and when simultaneously a delayed version of the detected video signal on line 122 passing through delay 607 appears on line 606.

The data loads into register 601 appears on output line 602 where it passes to comparator 603 which may be formed from, for example, Texas Instruments integrated circuit SN74S85 so that the comparator compares contents of register 601 with the contents of register 608 which appears on line 609. Whenever register 608 has a value which comparator 603 detects to be less than the value strobed into register 601, the output from comparator 603, on line 610, passes through AND gate 611 where it is clocked by the clock signal 109 to cause register 608 to strobe through line 612 the contents of register 601 through line 602 to register 608. At the beginning of each frame scan, a reset signal appears on line 613, which zeroes the contents of register 608. Consequently, at the completion of one frame of scan, the contents in register 608 correspond to the maximum value which appeared on line 113 during that scan during the time that a feature was being scanned, as defined by the binary video signal. Registers 601 and 608 may be formed from various integrated circuits including, for example, Texas Instruments SN74S175.

Glare Corrector

Glare is a problem which arises in optical systems from light which is scattered within the optics from the various optical surfaces. Its affect is to offset the black level of the video signal so that when black features are seen with a large amount of white area, they may not appear to be as black as the same black feature would if it was in a field of view with a large number of other black features. This offset component, or glare component, is shown diagrammatically in FIG. 7. The video signals arising from three images are shown. Each image represents a black feature, however, the size of the black feature 702 is larger in field 701, than is the black feature 706 in field of view 705. Features 702, 704, and 706 are taken to have the same level of black or the same density. Scan lines 707, 708, and 709, respectively, scan the features to produce respective video signals 710, 711 and 712. Video signal 710, corresponding to scan line 707 intercepting feature 702, has an excursion which effectively meets the voltage level corresponding to the black level of the field of view shown at level 713. The video signal 711 corresponds to feature 704 which is equally as black or dense as feature 702. However, the excursion of video signal 711 does not reach the black level 713, but instead is slightly above it by an amount $V_{G1}$. This discrepancy between the minimum level of video signal 711 and the black level 713 arises due to glare from stray light within the field of view. Similarly, with smaller feature 706, the video signal 712 shows a greater discrepancy $V_{G2}$ from threshold level 713, again due to glare.

Figure 8:
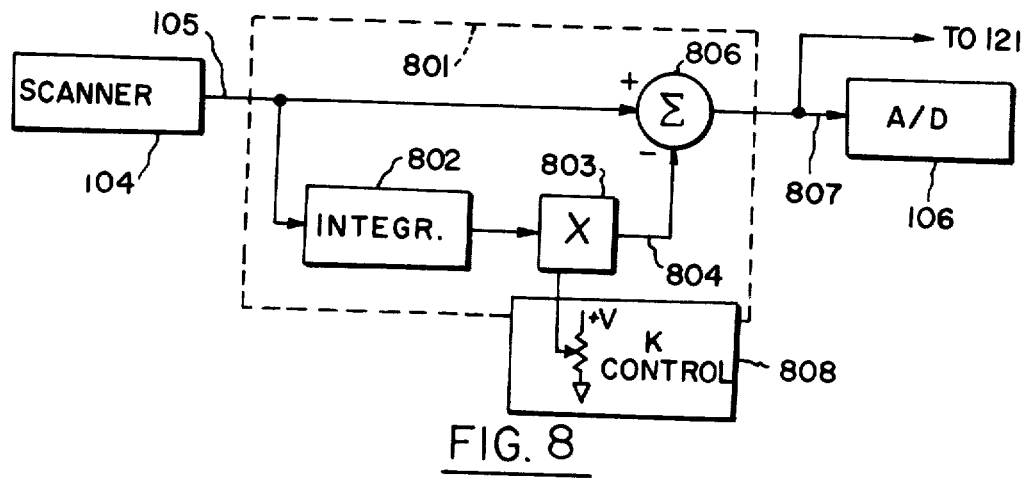
FIG. 8 is a diagram of a glare correcting circuit installed in the overall system.

In order to reduce the errors which are due to this offset of black levels resulting from the glare in the optical system, a glare correction circuit may be inserted between scanner 104 and A to D converter 106. Such a modified circuit is shown in FIG. 8. The video signal from scanner 104 passes on line 105 to glare corrector circuit 801. The glare corrector circuit comprises an integrator 802 which can be implemented using standard operational amplifier techniques or appropriate passive filter circuits buffered with a suitable isolation amplifier. This integrator 802 determines the average level of the video signal, that is the average white level or average amount of light which the video signal represents. This level is then multiplied by circuit 803 by a factor K which is manually or automatically determined experimentally, as hereinafter discussed. For the illustrated example generally, the factor K falls in the range of 0 to 0.1

The determination of the factor K can be performed by using artificial test samples having various percentages of black and white area, and then manually or automatically determining the multiplication factor K.

Figure 9:
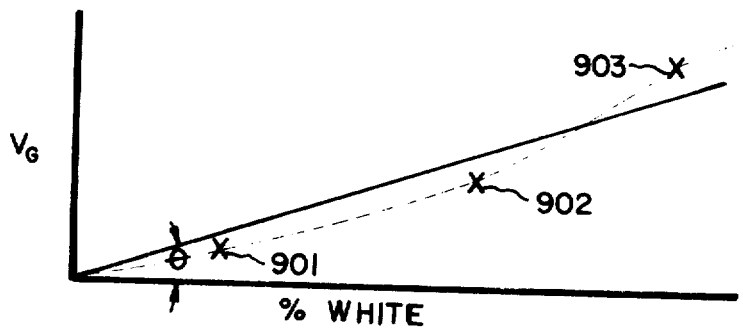
FIG. 9 is a plot of glare correcting voltage versus percent white in a field of view.

The manual determination procedure comprises taking artificial samples having various percentages of white, mounting them in the optical system as sample point 101, and measuring the minimum value of the black level to determine $V_G$, the glare component offset, as a function of the percentage of white in the field of view. This procedure performed for three reference samples of various percentages of white will produce a curve similar to that shown in FIG. 9, where the points on the curve 901, 902, and 903 correspond to the glare voltage level of three samples of various percentages of white.

The straight line of best fit through these points is then computed and its gradient defines the value K which is to be manually set in functional block 803 by the expression $K = \tan \theta$.

The output of this multiplier passes on line 804 to summer 806 which substracts from the video signal on line 105 the glare correction voltage on line 804, to result in a video signal having black levels throughout the scene being scanned which on the average unaffected by the glare component. The resulting signal is then processed as hereinbefore mentioned.

Shading Corrector

Accurate measurement of density requires the inclusion of some means of correcting for shading which may arise in the illumination optics and scanner and K control unit 808.

Figure 10:
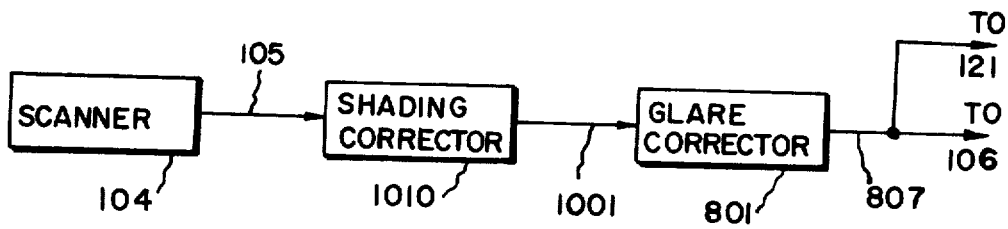
FIG. 10 is a diagram showing a shading corrector installed in the overall system.

The shading correction of the image is implemented by inserting, prior to glare correction circuit 801, but after the scanner 105, a shading corrector unit which corrects for shading which may occur at both the black and white ends of the video range. Black shading is due to offsets, sample independent glare, and dark current in the video signal, while white shading arises from variations in illumination, variations in sensitivity due to vignetting of the optics, and variations in sensitivity of the scanner pick-up tube. The shading correction operation involves storing reference images corresponding to reference samples. One of these reference images corresponds to a black or low light image obtained in transmitted light using an opaque specimen, and in incident light by using a non-reflective specimen, and storing electrically a video signal derived from a white image corresponding to a clear specimen in transmitted light and a reflective specimen in incident light. These stored images are used to modify the video signals such that the video signal so processed is free from shading and its white level is fixed to correspond to the intensity of the white reference image while its black level is fixed to correspond to the intensity of the image from the black reference. FIG. 10 shows a block diagram of the scanner, shading corrector and glare corrector included. The scanner 104 generates a video signal on line 105 which passes to shading corrector 1010 and, hence, on line 1001 the video signal corrected for shading passes to the glare correction circuit 801, producing on line 807 a shading corrected and glare corrected signal on line 807 to pass to detection circuit 121 and A to D converter 106.

Corrector System

Figure 11:
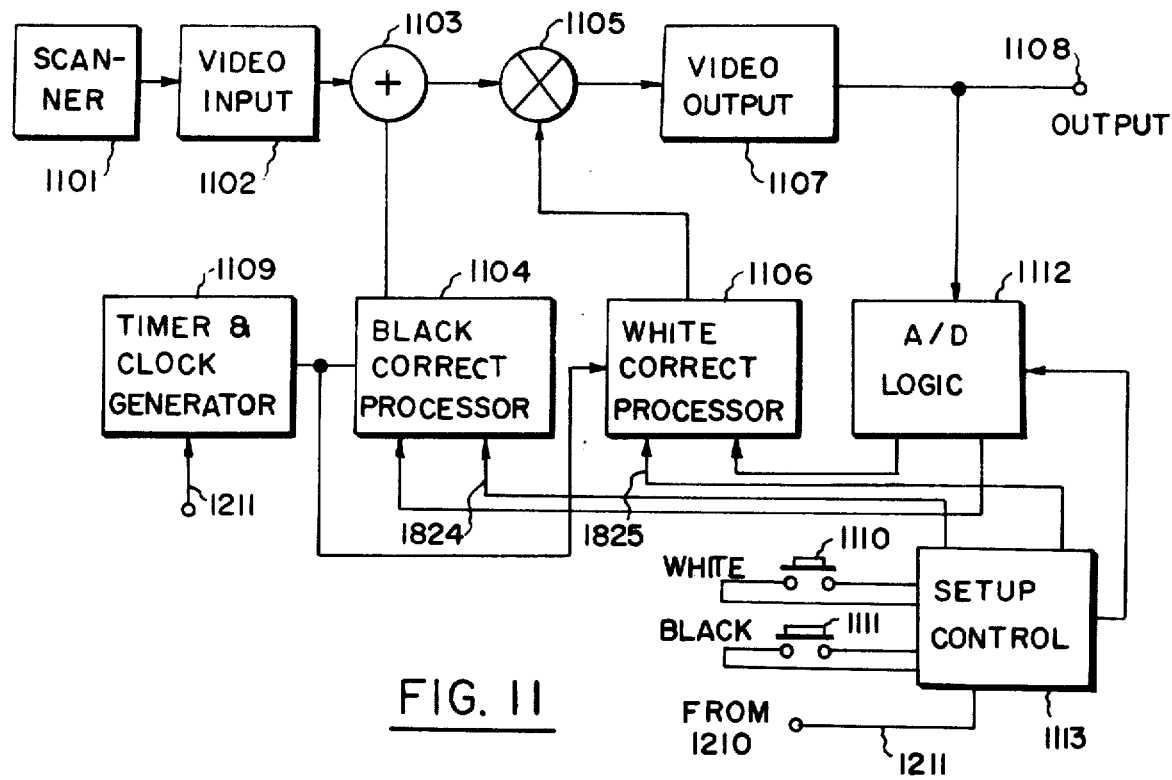
FIG. 11 is a function block diagram of a shading corrector according to the principles of the present invention.

The simplified block diagram of FIG. 11 illustrates the basic components of the shading corrector. A video signal from a scanner 1101 is received by the shading corrector video input 1102. A signal from the video input 1102 combines with an offset correction signal from a black processor 1104 at adder 1103. A multiplier 1105 receives the black corrected signal, from the adder 1103, and a correction signal from a white processor unit 1106. The resulting product signal from the multiplier 1105 is passed to video output circuit 1107 before proceeding at an output terminal 1108 and passing to the detection circuits. The timing and clock generator 1109 produces timing signals synchronized to the scan synchronizing signals which accompany the incoming video signal from the scanner 1101.

Figure 18:
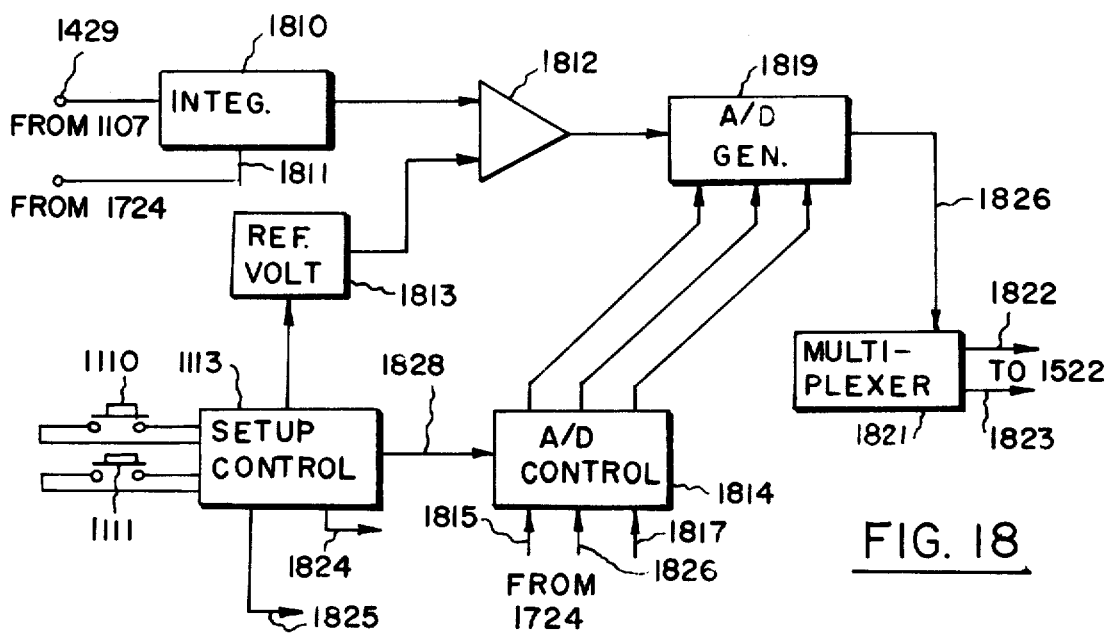
FIG. 18 is a functional block diagram of the A/D logic converter circuit, as illustrated in FIG. 11.
Figures 18A, 19:
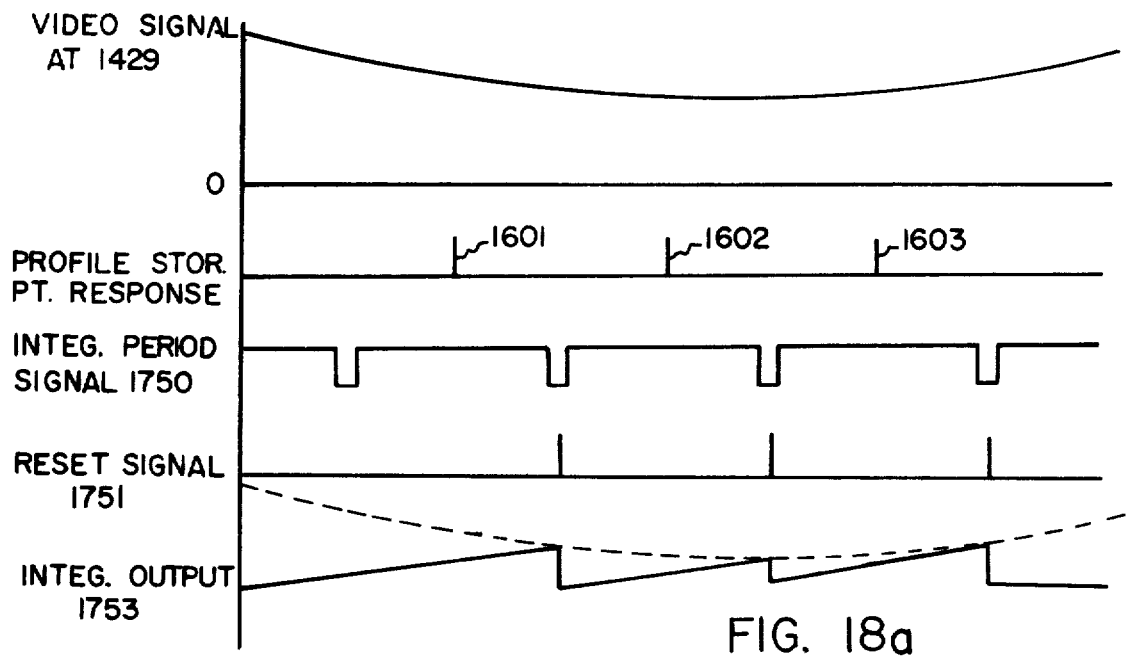
FIG. 18a is a graphical illustration of signal response corresponding to profile points.
FIG. 19 is an illustration of the word generation of the A/D word generator as illustrated in FIG. 18.

During a white setup operation, initiated by a white setup pushbutton 1110, or a black setup operation, initiated by the black setup pushbutton 1111, the analog-to-digital (A/D) logic 1112, under the control of a setup control circuit 1113, sequentially compares the output signal at terminal 1108 with a reference signal generated within the A/D logic 1112, as described previously in discussing the setup control disclosure with reference to FIG. 19. In the case of the black setup, the A/D logic 1112 generates data based on the comparison of the signal at output terminal 1108 with a black reference signal and this data is combined with data already in the memory of the black correction processor 1104 to form data representing a black correction profile.

Similarly during white setup, initiated by pressing pushbutton 1110, the setup control circuit 1113 causes the A/D logic 1112 to compare the output signal at the terminal 1108 with a white reference signal and to produce signals to load the white memory included in the white processor unit 1106. Once both the black and white memories of processor units 1104 and 1106, respectively, have been loaded during the setup process, the shading corrector system will correct any incoming video signal from the scanner 1101 in accordance with the information stored in the respective memories. When the shading corrector is inactivated by way of an external pushbutton, corresponding to the hereinbefore mentioned fourth mode or "OFF" condition, correction does not occur to the incoming video signal and it passes to the output terminal 1108 without correction.

Video Input Circuit

Figure 12:
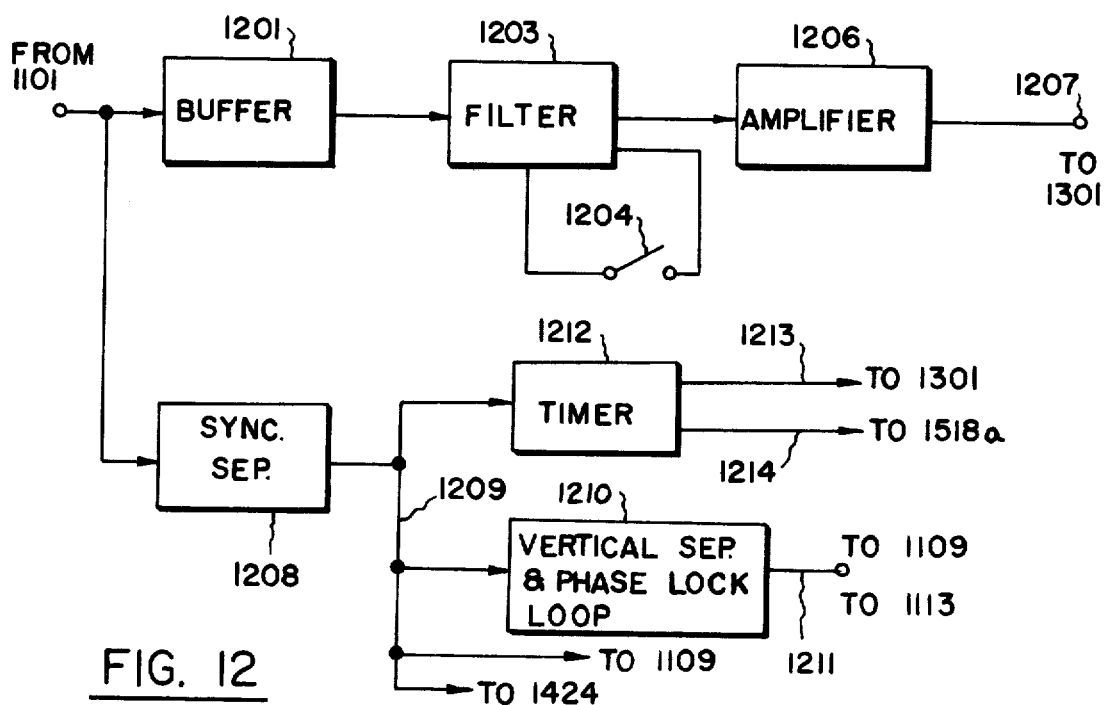
FIG. 12 is a functional block diagram of the video image circuit, as illustrated in FIG. 11.

FIG. 12 depicts a block diagram of the video input circuit 1102 of FIG. 11. The video signal from the scanner 1101 enters a buffer 1201 which may be, for example, an emitter follower employing 2N3643 transistor to electrically isolate the incoming signal from the variable bandwidth filter 1203, to which the signal is then passed. The filter is implemented using standard resistor capacitor and inductor components as a $-6db$ Gaussian Transition filter. See, for example, "Filter Synthesis" by Ziev. The bandwidth of filter 1203 may be changed by a switch control 1204. The control 1204 provides the operator the alternative of reducing noise in the video signal at the cost of slightly lower video resolution. Resolution is determined by the video bandwidth.

Figure 13:
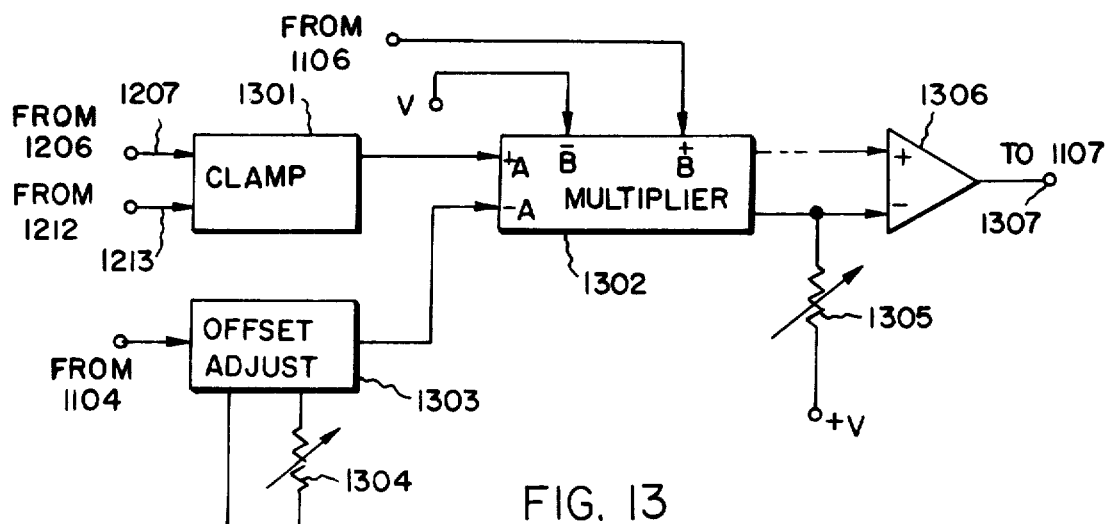
FIG. 13 is a functional block diagram of the video adder and multiplier units, as illustrated in FIG. 11.

The output of filter 1203 passes to an amplifier 1206 which produces an amplified filtered video signal at a low impedance at terminal 1207 connected to a clamp circuit 1301 of FIG. 13. In addition, the signal of the scanner 1101, passes to a synchronizing pulse signal separator 1208 which produces a composite synchronizing pulse signal on line 1209, corresponding to horizontal and vertical synchronizing pulses. (See, for example, "Basic Television" Bernard Grob, 3rd Ed., McGraw-Hill) The synchronizing signal of line 1209 is further separated from its vertical synchronizing pulse by a vertical separator and phase lock loop unit 1210. The purpose of the phase lock loop unit 1210 is to provide a continuous vertical synchronizing signal during momentary loss of synchronizing signal on line 1209. The output from the vertical separator and phase lock loop 1210 passes on line 1211 to those circuits in the corrector requiring a field or frame synchronizing signal, including the time and clock generator unit 1109 and the setup control circuit 1113. The output of the synchronous pulse signal separator 1208 on line 1209, also passes to a delay timer 1212, such as Signetics NE555 integrated circuit, which generates signals timed from the horizontal synchronous pulse to produce outputs on lines 1213 and 1214. As will be appreciated, the signal on line 1213 is asserted during the blanking period while the signal on line 1214 is asserted during the blanking time after the horizontal synchronous pulse. Finally, the signal on line 1209 is also sent to the timing and clock generator unit 1109. For further information on the techniques of processing video signals, see, for example, "Basic Television", Bernard Gorb, McGraw-Hill, *Third Edition* especially pages 53 to 56, pages 234 to 235, and pages 276 to 278.

Video Adder and Multiplier

Schematic illustration of the video adder 1103 and multiplier 1105 is present in FIG. 13. The signal from line 1207 passing from the filter 1203 and amplifier 1206 is received from the video input circuit of FIG. 13. The signal from line 1207 passing from the filter 1203 and amplifier 1206 is received from the video input circuit of FIG. 13 and passes to a clamp circuit 1301 implemented using an analog switch transistor which clamps the video signal, thereby removing the synchronizing pulse when timing pulse on line 1213 is asserted and performing level restoration in order to establish the signal at a fixed black level.

The signal then passes to one of four inputs of an analog multiplier 1302, such as a 4 quadrant Motorola MC1495 multiplier. The multiplier has four inputs which are: the positive and negative A inputs, and the positive and negative B inputs. The output of the multiplier is proportional to the difference in voltage of the A inputs times the difference in voltage at the B inputs. The clamp circuit 1301 feeds the positive A input, while the negative A input receives the adjusted black or offset correction signal from a resistive network 1303 having an adjustable offset input control 1304. The purpose of the resistive network 1303 and its associated adjustment control 1304 is to provide means for adjusting to remove the effect of offset voltages arising in the multiplier 1302 and other analog components in the shading corrector. A second input to this network 1303, corresponding to the black correction signal, is received from the black processor 1104. Thus, subtraction of the black correction signal in the multiplier 1302, as the circumstance dictates, is performed before the actual multiplication operation in multiplier 1302. At the positive B input of the multiplier 1302, a white correction signal from the white memory and interpolation processor 1106 is received. The negative B input is connected to a fixed voltage. The multiplier 1302 multiplies the incoming video signal, combined with the offset signal, by the value of the white correction signal. The output from the multiplier 1302 is subject to an adjustable offset through a resistor 1305 prior to being amplified by high speed integrated circuit operational amplifier 1306 to produce a multiplied corrected video signal at output 1307 corresponding to the output from the video adder 1103 and multiplier 1105 circuits of FIG. 11.

Video Output Circuit

Figure 14A:
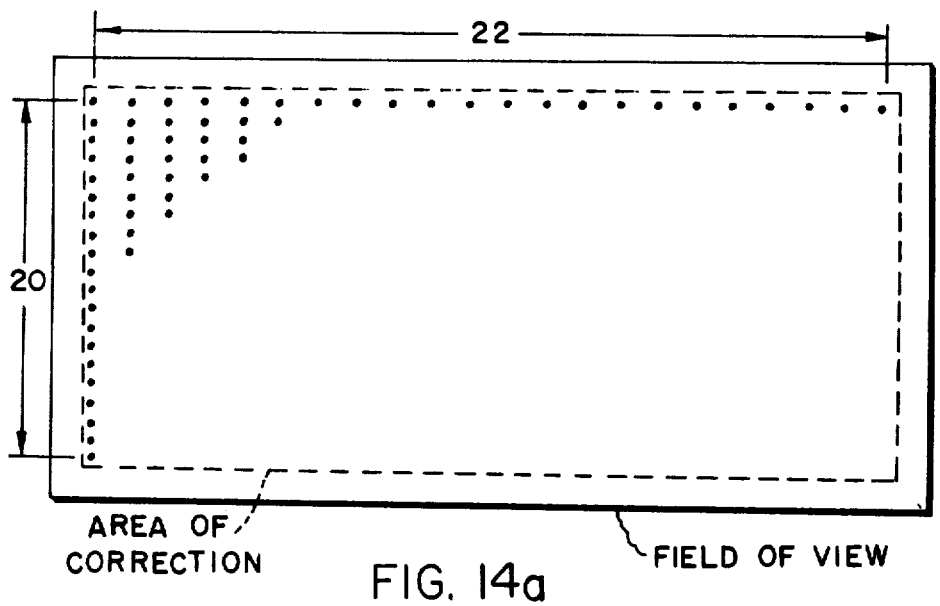
FIG. 14a is a diagrammatic pattern of the profile storage points for interrogation of the field of view.
Figure 14:
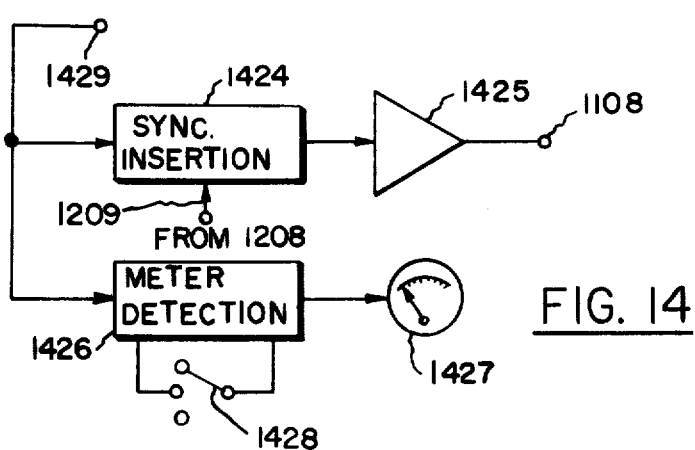
FIG. 14 is a general schematic and functional block diagram of the video output circuit, as illustrated in FIG. 11.

The amplified signal on line 1307 passes to synchronizing pulse insertion circuit 1424, as illustrated in FIG. 14, which receives from the horizontal synchronous signal separator 1208 through line 1209, the synchronizing signal to be inserted, to thereby generate a composite video output signal. This signal, amplified by an output amplifier 1425, constructed using discrete components, passes to output terminal 1108 to provide a shading corrected video signal which is the desired output of the shading corrector.

In addition, at the output junction 1429, a meter detection circuit 1426 determines the maximum value of the video signal by determining the positive peak value of the video signal using a positive peak detection circuit and minimum values of the video signal by using a negative peak detection circuit, and passes these maximum and minimum values to a meter 1427. The maximum value or minimum value, or the difference between the maximum and minimum values, then can be selected by a switch 1428 which passes to the meter either the positive peak value, negative peak or difference value, and thereby produces in an indication on the meter of maximum, minimum or maximum minus minimum readings for adjustment of the optics or the scanner.

Black and White Correction Processors

The black and white correction processor circuits 1104 and 1106 are essentially identical, Accordingly, as will be appreciate, discussion of one of the units will suffice for the other. The basic process in black and white correction is that of receiving from a large shift register memory the correction data generated during the black or white setup operations, interpolating this correction data in two dimensions so that adjacent profile points in both X and Y directions are joined by a smooth profile. This interpolated information is converted into an analog signal and filtered in buffer amplifier 1518a, with respect to FIG. 15, to provide a smooth, noise free correction signal for use by the video multiplier 1105 or adder 1103 to which the respective processor is connected. The black and white processors use a combination of serial and parallel digital arithmetic techniques comprising basic computational functions that are described in "Computer Handbook", Edited by Harry D. Huskey and Granino A. Korn, McGraw-Hill Book Company 1962, Section 15 entitled Digital Computer Arithmetic and, specifically, Section 15.1 through 15.18.

FIG. 14a shows a pattern of profile storage points at which shading information is collected. These points occur on 20 lines per field, designated as transfer lines in a field of view, with 22 points per transfer line, for a total of 440 points for black correction and 440 points for white correction over the field of view. Successive full fields of 262 or 263 lines combine to form a frame of 525 lines in accordance with standard 525 line television practice. Correction occurs effectively on 240 of these lines per field.

Figure 14B:
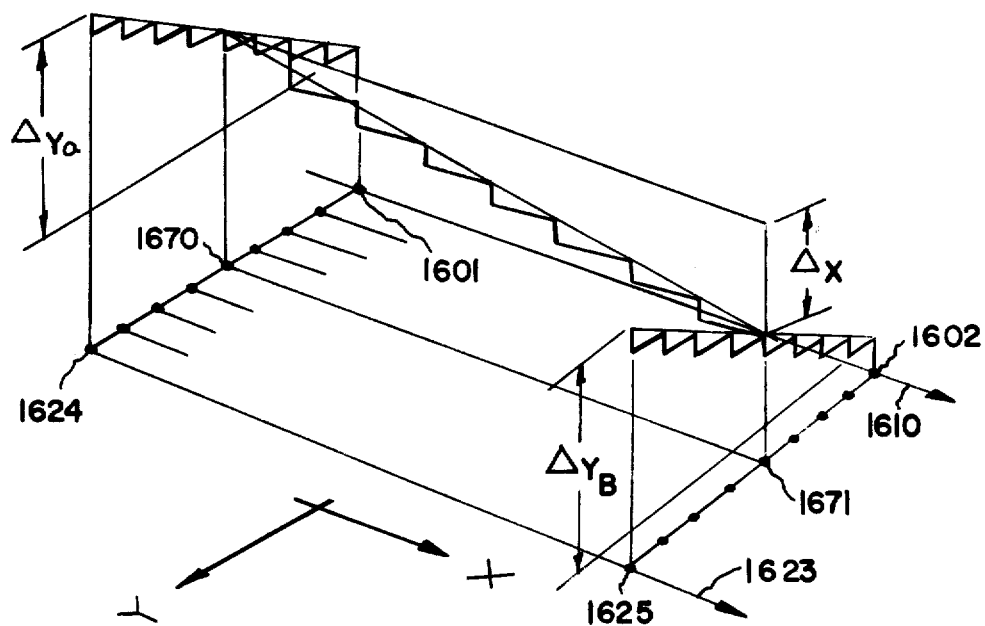
FIG. 14b is a geometric illustration of a 2-dimensional profile smoothing, as accomplished by the shading compensator of FIG. 11.

A geometric example of the two-dimension smoothing operation is shown in FIG. 14b. Lines 1610 and 1623 are transfer lines which are lines upon which profile storage points are situated. There are, for example, 20 transfer lines per field of view in the preferred embodiment. There are, for example, 22 profile storage points along each transfer line and those points are spaced a distance apart, such that the time to scan between them is equal to the time it takes one full 12 bit word to pass through shift register memories storing 12 bit words, for example, memories 1503, 1509 and 1506 as described herein. All profile storage points are disposed equidistantly from each other along each transfer line, and are aligned with the profile points of the other transfer lines. In FIG. 14b, profile storage points 1601 and 1602 lie along transfer line 1610 and profile storage points 1624 and 1625 lie along line 1623. This is illustrated in more detail in FIG. 16. Vertical lines from a known base value to these profile points, correspond to the values of the word stored for these points, that is, these lines represent the amplitude of the signal at this point. Interpolation between each adjacent 2 profile storage points of each transfer line and the corresponding aligned 2 profile storage points of the subsequent transfer line is done in order to produce a smooth correction signal along the transfer lines and all intermediate scan lines.

Figure 16:
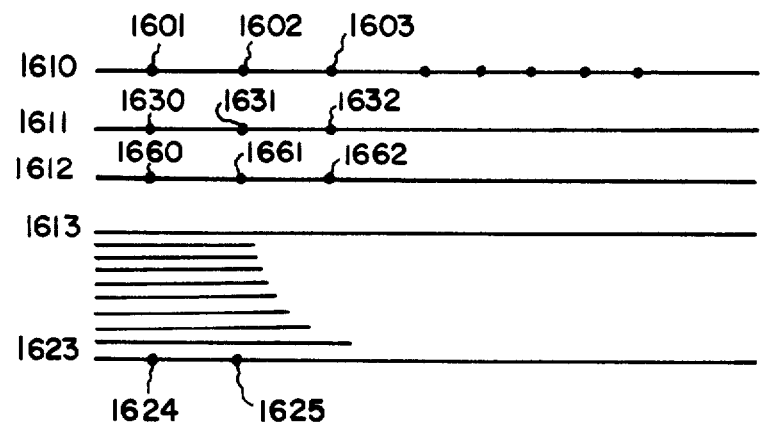
FIG. 16 is a diagram of profile storage points along lines of a video scanner, as illustrated in FIG. 11.

Interpolation is first done in the designated Y direction and is based on the computation of the difference between the value at profile storage point 1601 and the value at profile storage point 1624. This difference corresponds to $\Delta Y_a$, which is the difference in Y amplitude between the two points 1601 and 1624 lying in a line in the Y direction. To interpolate between these two points, the difference $\Delta Y_a$ is computed and divided by 8 with respect to the amplitude at points 1601 and 1624 and then added 7 times starting at the initial amplitude at 1601 to form eight uniform steps, stepping up, in this case, as illustrated at FIG. 16, to the greater value of point 1624. Thus, $\Delta Y_a$ is used to determine the gradient that is used by appropriate scaling to add-in in equal increments to the initial value point of 1601 to correspond to the final value of point 1624. The same interpolation process occurs for $\Delta Y_b$, computed as the difference in amplitude between points 1602 and 1625.

The interpolation in the direction designated X uses a similar technique to determine the difference in amplitude $\Delta X$ between two interpolated sets of points lying on lines in the Y direction. Thus, $\Delta X$ is then appropriately scaled and added eight times to the initial value along the X interpolation line, for example, from point 1670, to again produce a final value, for example, at point 1671. In fact, between scan lines 1610 and 1623, there are an additional 11 lines, eight of which have Y interpolation values computed. Thus, over the rectangle joining 4 adjacent profile storage points, there are 96 interpolation values computed.

Figure 15:
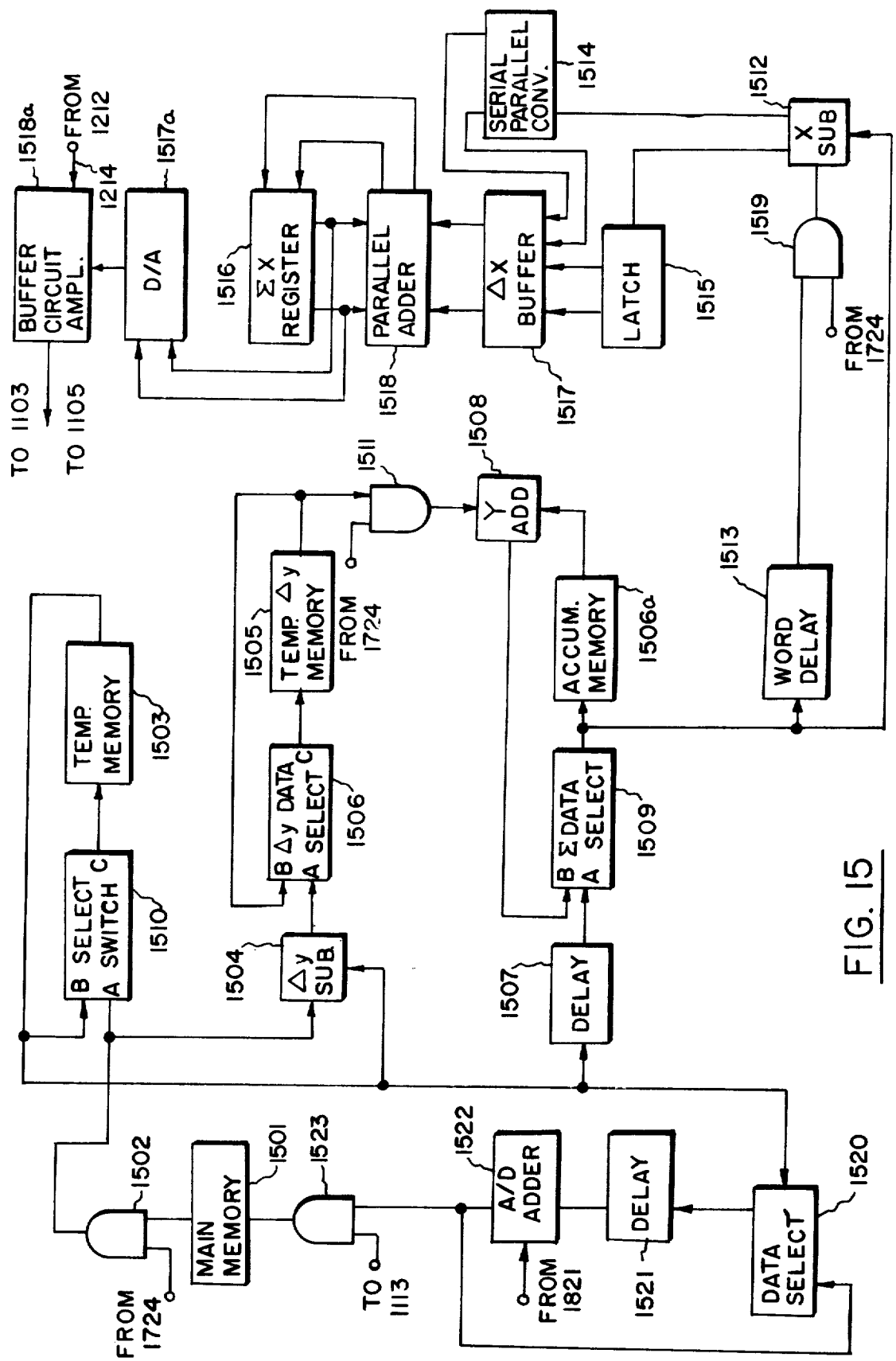
FIG. 15 is a typical functional diagram of either the black or white processor as illustrated in FIG. 11.

FIG. 15 shows a block diagram of a typical processor for each black or white correction unit 1104 and 1106, respectively. A main memory 1501, which may be constructed from large MOS shift registers, stores serial words, 9 bits long, corresponding to the black and white values of the storage points on the correction profile compiled during the black and white setup operation at profile storage points along transfer lines of the scan of scanner 1101. FIG. 16 shows examples of these specific points. For example, profile storage points 1601, 1602, 1603 and so on, occur along transfer line 1610. Transfer line 1610 is followed by a scan line 1611 along which no profile storage points are stored. During a scan along a transfer line such as line 1610, the main memory 1501 outputs profile storage point data, whereas, for example, during a scan along line 1611, a non-transfer line, the main memory 1501 does not output data corresponding to profile storage points. This condition applies to each of 11 subsequent scan lines, for example, 1612, 1613, and so on, up to the next transfer line, line 1623, which contains profile storage points 1624, 1625 and so on.

During the scan time between adjacent profile storage points, for example, points 1601 and 1602, a word of 9 bits passes from the output of the main memory 1501 to gate 1502. In the process of generating a smooth two-dimensional interpolation between any four profile storage points, for example, point 1601 and 1602 of one transfer line and points 1624 and 1625 of the next adjacent transfer line, a preferred first operation is to perform an interpolation in the Y or vertical direction, for example, between points 1601 and 1624. This is performed with the aid of a temporary memory 1503, which may be constructed from shift registers, which stores in a 12-bit format, all words, for example, corresponding to the profile points on line 1623. These words which are stored in a 12-bit format, are converted from the 9-bit format by means of AND gate 1502, which ensures that the 3 additional bits of the 12 bits have zero value, while the other 9 bits have a value derived from the main memory 1501.

In order to perform the interpolation in the Y direction, for example, between points 1601 and 1624, it is necessary to store in the $\Delta Y$ memory 1505 (similar to memory 1503), the difference between the shading values of points 1601 and 1624 and likewise for other aligned points in the Y direction, like points 1602 and 1625, and so on; which values are derived during the time the shading values for the points on line 1623 are transferred from the main memory 1501 to one input of a $\Delta Y$ subtractor 1504 which may be constructed using Texas Instruments (TI) SN7480 and SN74S74 integrated circuits. Simultaneously, shading values for the points on line 1610 are transferred from the temporary memory 1503 to another input of the subtractor 1504. This sequentially generated difference data is passed into a temporary $\Delta Y$ memory 1505, where it is circulated through a $\Delta Y$ data selector 1506 (for example, Texas Instruments SN74S157) during the scanning of non-transfer lines between the transfer lines 1610 and 1623.

The interpolation is performed by taking one line of profile storage point data, for example, the data of line 1610, and passing it to a Y interpolation accumulating memory 1506a (similar to memory 1503) during the scanning of line 1611. The value of this data is multiplied by 8 in a 3 bit delay 1507 (for example, Texas Instruments SN7491A), as in the normal manner of serial arithmetic, a 3 bit shift, will cause a multiplication by 8 of the values which are transferred into the Y interpolation accumulating memory 1506a.

On 7 of the 11 lines between, for example, transfer lines 1610 and 1623, which lines are selected to be as close to equally spaced as possible, the difference in the temporary $\Delta Y$ memory 1505 is added to the contents of the Y interpolation accumulating memory 1506a through a Y adder 1508 (which is similar to subtractor 1504), before the data is returned via a summation data selector 1509 (which is similar to selector 1506) to the Y interpolation accumulating memory 1506a. Thus, on the intermediate scan lines between line 1610 and 1623 there reside in the Y interpolation accumulating memory 1506a, the values corresponding to the intermediate interpolation values between these two lines, taken in 8 equal steps. Of these 8 steps, 7 are obtained by interpolation, while the 8th step is taken when new data enters during the transfer line 1623. These values can be visualized as corresponding to values at interpolation points 1630, 1631, 1632, etc. and 1660, 1661, 1662, etc., for every scan line, as best seen in FIG. 16.

The sequence of operational events can best be understood after the more detailed consideration of the operation of a data selector switch 1510 (which is similar to selector 1506) which switches the input data into the temporary memory 1503, the data selector switch 1506 which switches the data into the temporary $\Delta Y$ memory 1505, and the data selector 1509 which switches the data into the Y interpolation accumulation memory 1506a. During the scan of transfer line 1610 or 1623, the main memory 1501, as already stated, produces data at its output which is converted by the gate 1502 to a 12-bit format. This data then passes from input terminal A to output terminal C of data selector switch 1510, and, simultaneously the output data from the temporary storage memory 1503 is passed to both the input of the $\Delta Y$ subtractor 1504 and also to the 3-bit delay 1507, so that for the three switches 1510, 1506 and 1509, the data is passing from input terminal A to output terminal C of each respective switch. During a scan of any line which is not a transfer line, for example, lines intermediate to 1610 and 1623, the transfer line data is recirculating and stored or accumulated in these memories 1503, 1505 and 1506a due to the switching operation of switches 1510, 1506 and 1509, the data being passed from input terminal B to output terminal C, respectively, of each switch.

During the scanning of the 4 non-interpolation lines occurring, for example, between transfer line 1610 and 1623, gate 1511 introduces a zero into adder 1508 so that the data in the Y interpolation accumulating memory 1506a is not changed from its previous line as it passes through adder 1508. In the preferred embodiment all operations of interpolation in the Y direction occur using the serial arithmetic techniques with serial adder 1508 and serial subtractor 1504 by means of the usual serial processing technique. Memories are shift registers or similar delay lines. However, the same principles may be implemented using a combination of the above and random access memories. Also, in combination, parallel arithmetic, rather than serial arithmetic units could be used.

Interpolation in the X direction is achieved by means of serial subtractor 1512 (which is similar to subtractor 1504) receiving the Y interpolation accumulator output word from one word line delay 1513 at one input and the prior word at its other input. These two words are subtracted to determine the difference in the X direction, for example, between interpolation point 1630 and interpolation point 1631 of FIG. 16. This difference is passed into a 9-bit wide serial to parallel shift register (constructed, for example, from intergrated circuit TI SN74164) or converter 1514 to which is appended 3 sign bits stored in a three bit latch 1515 (for example, Texas Instruments 74125). Thus, the value which appears in the serial to parallel converter 1514 is the gradient or difference in the X direction between two adjacent interpolation points, for example, points 1601 and 1602 or points 1630 and 1631. During the time that this data is tranferred into the serial to parallel shift register 1514, and its sign bit addendum 1515, the previous value, for example, the value at point 1630 or point 1601, respectively, will have been previously accumulated in the X in interpolation sum register 1516 constructed, for example, from Texas Instruments SN 74175 integrated circuits. Thus, to form the 8 interpolation points between, for example, interpolation points 1601 and 1602, or interpolation points 1630 and 1631, it is only necessary to add eight successive times, the difference resident in the serial to parallel converter 1514 and the addended sign bits from latch 1515. This is achieved by transferring this data initially into a ΔX buffer 1517 similar to register 1516, and then performing the addition in a 12-bit parallel adder 1518 (constructed for example from Texas Instruments SN74283), afterwards storing the results in summing register 1516 and then presenting these new results again into the parallel adder 1518, along with the difference data in buffer 1517.

This operation is performed 8 times between adjacent points, such as points 1601 and 1602 or points 1630 and 1631, thereby presenting at the output of the X interpolation sum register 1516, a 12-bit parallel number which may be transferred to the digital-to-analog converter 1517a, to generate a waveform corresponding to the interpolated profile. This waveform is then passed to buffer circuit 1518a. The buffer amplifier circuit includes isolation amplifier filter. It removes voltage spikes inherent in the digital-to-analog process by filtering and clamping with a switchable clamp the output voltage to ground when the signal of line 1214 is asserted prior to being passed to the multiplier input 1105 or adder input 1103.

To pass between any two profile storage points on a transfer scan line 1610 or interpolation points on a non-transfer scan line, the X interpolation operation is performed in 8 equal steps, based on the value difference between words for adjacent points as obtained from the serial subtractor 1512 and passed through the serial to parallel shift register 1514 and stored in the ΔX or difference buffer 1517. Thus, in general, between successive points, the information received by the parallel adder and register combination 1518 and 1516, respectively, corresponds only to differences between adjacent points having a value equal to ⅛th the total difference, each fractional difference then being added 8 times.

In order to initially set up a value in register 1516, corresponding to the absolute value at the beginning of a scan, provision is made through a gate 1519 to disable the input of the prior word into subtractor 1512 and to present, instead, a zero at this input. Thus, the actual value of the word passes from output C of switch 1509 directly through serial subtractor 1512 into the serial to parallel shift register 1514. Control signals generated by the timer circuit 1109 pass to control gate 1519 to initially reset to zero the value of the X interpolation sum register 1516, causing the actual value, rather than a difference value of the first point, to appear in register 1514 and its addended carry bits of latch 1515. Thus, this value which has an ⅛th of a desired value of the data to appear in register 1516 is added eight times into the already zeroed contents of register 1516, to initially form the desired value of the initial point of the shading corrector profile. After this, all subsequent values in a field are determined by interpolation based on the difference between successive points. In order that data is returned to the main memory 1501 for use in subsequent interpolations, it passes through data selector 1520 similar to selector 1510 and three word delay 1521 (constructed from integrated circuits Texas Instruments SN74164), A/D conversion adder 1522 similar to subtractor 1504) to a zero memory AND gate 1523, back to the input of the main memory 1501.

Timer and Clock Generator

Figure 17:
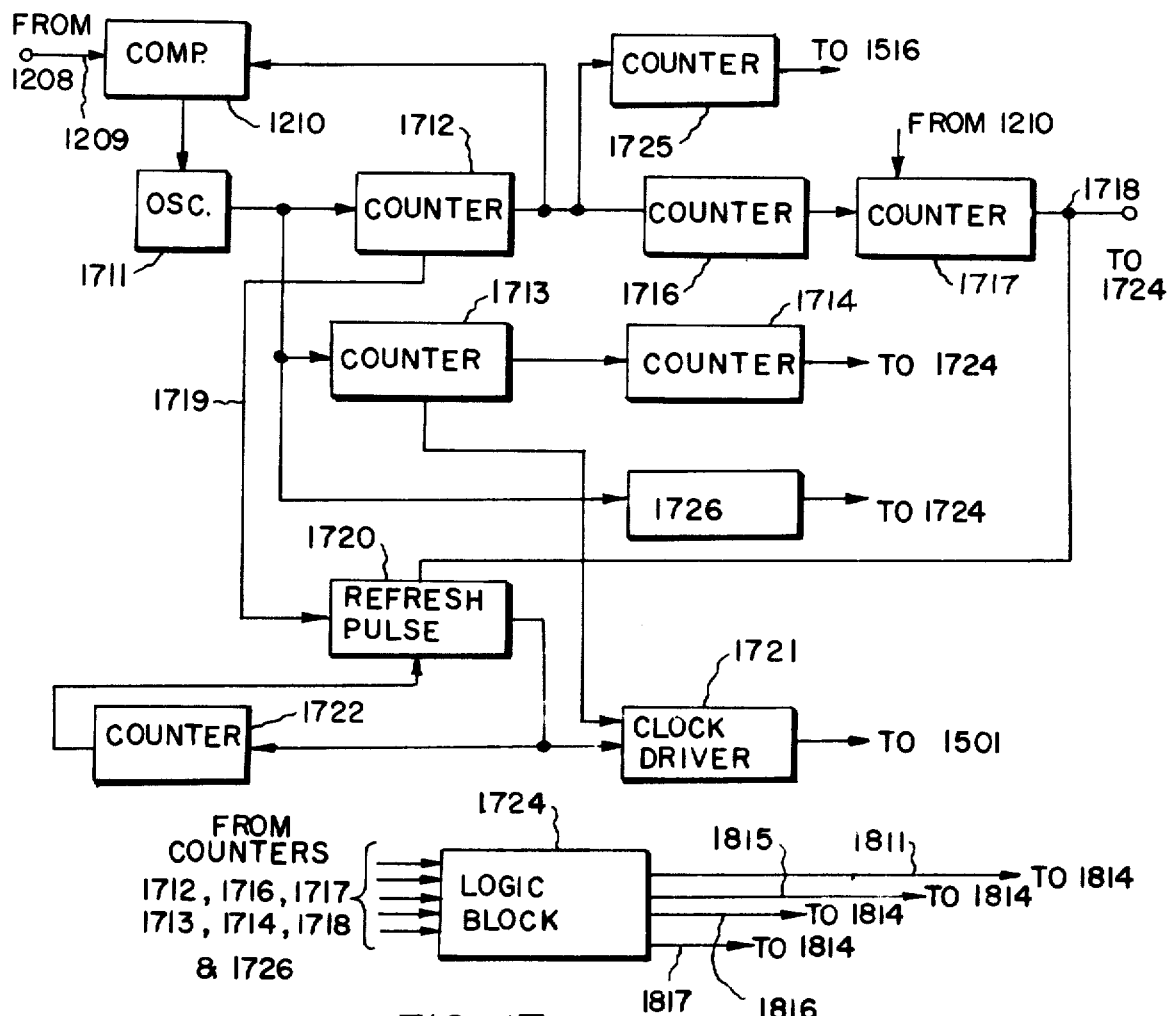
FIG. 17 is a functional block diagram of the timer and clock generator of FIG. 11.

FIG. 17 diagrammatically illustrates a block diagram of the timer and clock generator circuit 1109 of FIG. 11. Number of counts, for example, correspond to a 525 line per frame scan at 30 frames per second scan format. A horizontal synchronous pulse signal comes in on line 1209 into the phase comparator 1210 which generates the phase comparison voltage to drive a variable frequency oscillator 1711 (running at approximately 20 MH$_z$) for example, Signetics integrated phase lock loop device NE560B, described in "Signetics Linear Integrated Circuits Data Book", 1972, pages 201 to 205. Oscillator 1711 drives a counter circuit 1712, constructed from, for example, Texas Instruments SN74S163, producing one output pulse for every 1328 input pulses, generating a reference frequency corresponding to the same frequencies as the horizontal sync signal for the second input of the phase comparator 1210 to form a phase lock loop. The output of the variable frequency oscillator 1711 also drives a state counter 1713, constructed from, for example, Texas Instruments SN74S163 integrated circuits, to count off twelve states or bits during each serial word. The word boundary pulse defining the beginning of each serial word from counter 1713 drives a 22 count word per line counter 1714 to count the number of words per scan line. The output of countdown counter 1712 corresponding to the horizontal synchronizing pulse generated by the phase lock loop is counted-down in a counter 1716 by the factor of twelve to produce a transfer line signal at its output corresponding, for example, to transfer lines 1610 and 1623. The transfer line count is counted-down by the factor of twenty in counter 1717 to produce a pulse per frame at its output terminal 1218 corresponding to the active period of each transfer line scan.

A line 1719 from counter 1712 provides an intermediate frequency pulse to a refresh pulse generator 1720. The purpose of this pulse generator 1720 is to generate a refresh pulse frequency for the operation of the main memory between transfer lines. This refresh pulse frequency ensures that main memory 1501 is operating always at a frequency above its minimum frequency of 10 $KH_z$, and also permits the main memory 1501 to have a number of bits which is readily implemented. In the preferred configuration, the refresh pulse frequency is switched between two frequencies. One is used inbetween transfer lines of adjacent fields and one is used between adjacent transfer lines in the same frame. The refresh pulses are combined with an output from the state counter 1713 to form the main memory 1501 clock pulses by clock driver 1721. The output of driver 1721 is used to drivethe main memory clock. The control signal to select the two frequencies of the refresh pulses comes from line 1718, corresponding to the time required by the scan to intersect the corrected area, and the time the line is scanning outside the corrected area. A counter 1722 controls the count of the refresh pulses by counting for twenty counts and then inhibiting refresh pulse generator 1720 and an additional logic block 1724 receives inputs from various counters, including counters 1712, 1713, 1714, 1716, 1717, 1718 and 1726 to generate, by employing elementary combinatorial logic, timing and strobe signals controlling the occurrence of the various events, hereinbefore mentioned in the disclosure of the black and white processors 1104 and 1106, respectively. Finally, counter 1725 counts to determine those 7 scan lines of the 11 lines between transfer lines at which an interpolation is performed.

The function of a counter 1726 is to define the position of the 8 points of interpolation in the X direction between, for example, the stored profile points 1601 and 1602, or interpolation points 1670 and 1671, by counting down to a frequency of approximately 3.33 $MH_z$, to control the X interpolation function of the black and white processors 1104 and 1106, respectively. All counters may be constructed from integrated circuits, such as Texas Instruments SN74S163.

Setup Control

The purpose of the setup operation is to load the main memory 1501 with the correction profile information. The setup control employs JK flip-flops, such as Texas Instruments Sn7476, in conjunction with combinatorial logic to establish on the appropriate control lines the conditions described. As already discussed, data is stored as 9 bit words in main memory 1501. The setup operation involves solving of the correction equation for the coefficients $a_1$ and $a_2$, which is $$v_o = a_2(v_i - a_1).$$

In the equation $v_o$ is video output and $v_i$ is video input at every profile storage point (i.e., points like those designated 1602 and 1603). In the setup sequence, the initial conditions for black setup are: $v_o = 0$ and, therefore $a_1 = v_i$, and for white setup: $v_o = 1$ and, therefore, $a_2 = 1/(v_i - a_1)$. Thus, in order to satisfy these conditions of the solution of the correction equation, it is necessary that a black setup be done to determine offset $a_1$, before a white setup to determine variation in sensitivity $a_2$.

The solution of the equation for the white condition involves the use of a feedback loop around through the multiplier 1105, video input 1107, A/D logic 1112, and white correction processor 1106. Such feedback techniques are well known, a similar loop being shown in FIG. 7. 46b on page 279 of "Operational Amplifiers Design and Applications" by J. D. Graeme, G. E. Tobey, and L. P. Huelsman, published by McGraw-Hill, 1971. In this figure, the signal $e_o$ corresponds to $a_2$ generated in response to $v_i - a_i$ corresponding to the denominater in the above equation solving for $a_2$.

During black setup, a black reference image, such as an opaque specimen in transmitted light corresponding to the minimum white level, is placed in the optical system imaging the black reference onto the scanner 1101 or under a microscope, such as the microscope of reference U.S. Pat. No. 3,805,028. This black reference need not produce zero light level, in fact, it need only produce a light level which is lower than the lowest light level anticipated in the sample specimen. This enables the corrector to expand the range of contrast available, as well as removing artificially induced unevenness of the specimen.

During black or white setup, the main memory 1501 is loaded with the set of data which produces at the output terminal 1429 adaptive of FIG. 14, a signal which, after integration, corresponds to an electronically generated reference voltage. This is achieved through a two step sequence A/D conversion technique, although other A/D conversion techniques can be used. The first step is successive having approximation, the second step involves a series of fine adjustments.

The A/D conversion technique used is based on a serial successive approximation method. See, for example, "Analog to Digital/Digital to Analog Conversion Techniques" by David F. Hoeschele, Sr., published by John Wiley & Sons, 1968, pages 360 to 361 and 385 to 392.

FIG. 18 shows a block diagram of the A/D conversion circuitry. The signal from terminal 1429 on FIG. 14 enters a resetable RC integrator 1810 which is caused to integrate from a time starting before the occurrence of the video signal generated at the position corresponding to the position of the stored point, to a time after the occurrence of the video signal at that point, as indicated in FIG. 18a to average out any noise across the profile. The integration time is chosen to be slightly less than the time to scan between successive profile storage points, for example of points 1601, 1602, 1603 in FIG. 16, and the integration time occurs so that the profile storage point occurs roughly at the midpoint or center of the integration period signal 1750 as best seen in FIG. 18a. The integrator 1810 is reset to zero after each integration period as shown in FIG. 18a. The reset signal 1751 of FIG. 18a is controlled by a signal from line 1811 which signal is generated by the timing logic 1724 of FIG. 17 from signals from the counter 1713. The integrator output signal 1753 is passed to comparator 1812 such as Texas Instrument 72710 which compares the integrator signal with the reference level generated by a switchable reference voltage source 1813 constructed from resistors and an analog switch integrated circuit. This source is controlled by the setup control circuitry 1113. This control circuitry receives the setup initiation signals from either the black setup button 1111, or the white setup button 1110, to perform functions which include: (a) turning on the shading corrector system, (b) setting the reference voltage source 1813 for black setup where the voltage corresponding to the black voltage on the video signal for black setup and for white setup the voltage corresponds to the white level of the video signal, (c) ensuring that after the power has been turned ON to the shading corrector, a black setup is performed before a white setup, (d) turning on lights associated with the pushbuttons to indicate the type of setup next required, and (e) generating the setup initiation signal which is passed to an A/D control circuit 1814.

The A/D control circuit 1814 also receives timing signals on a line 1815 from the timing decoding logic 1724. These timing signals correspond, in the case of the signal on line 1815, to a pulse at the beginning of each word. Pulse signals on line 1816 each correspond to a single bit in each word from logic unit 1724. The signal of line 1817 is a pulse occurring for each new field of view passing from counter 1717 through the logic unit 1724. These signals are used by the A/D control logic 1814 to control an A/D word generator 1819 which produces a signal on a line 1820 containing in serial format the A/D generation word. This word is then directed through lines 1822 or 1823 by multiplexer 1821, controlled by setup logic 1113, to the white A/D adder or black A/D adder, respectively, designated typically as unit 1522 of FIG. 15.

The A/D control circuit is a counter comprising, for example, Texas Instruments SN74S163 integrated circuits, which keeps count of the number of the field of scan being traversed during the A/D setup sequence. The A/D word generator employs a counter (for example, Texas Instruments SN74S163)and combinatorial logic constructed of TTL integrated circuit gates to generate a serial word of the appropriate value, in response to output from comparator 1812 and control signals from A/D control 1814 which define which bits in the serial word generated on line 1820 are to be used in the approximation for the current scan.

A further function of the setup control logic 1113 is to control the zero memory gate 1523 individually on either the black processor 1104 or the white processor 1106, depending on which one is being setup during the first field of scan of a setup. These lines for control pass from setup control logic 1113 and are lines 1824 and 1825, respectively.

The description of the sequence of either a black or white setup is as follows. The setup requies, for example in the preferred embodiment, 26 fields of scan. The operations during these fields of scan are as follows.

During the first field, appropriate memory contents are reduced to zero through line 1824 or 1825 to gate 1523 and the entire main memory 1501.

A second field is used to set the most significant bit of the word by generating a word with the A/D word generator 1819, with most significant bit of the word set to "one" followed by "zeroes". This word is passed through the multiplexer 1821 to the appropriate A/D adder 1522 to insert a word with its most significant bit set to "one".

During a third field, a word is generated with its next most signficant bit set to "one", which is bit number 7 in a 9-bit word, where bit number 8 is the most significant bit and bit number "zero" is the least significant bit. This pattern is followed for subsequent fields of view through to field number 7 as shown in FIG. 19.

Thus, after setting the contents of the memory 1501 to "zero" in the first field, during fields 2 through 10 successive binary approximations on every word, stored in the memory 1501, corresponding to points in the field are performed to improve in binary steps the approximation word for each of these points. For further information on this technique, see "Digital Principles and Applications" by Albert Paul Malvino and Donald P. Leach, published by McGraw-Hill 1969, pages 305 to 307. The X used in FIG. 19 takes the value of "one" for those words in the memory which are to be decreased and "zero" for those words in the memory which are to be increased. In fields 11 through 26, which are odd-numbered fields, a word is added corresponding to one least significant bit, if the word in memory is to be increased; and "zero" is added if the word is to be decreased. Conversely, on even numbered fields, a number consisting of all "one's" corresponding to a value of minus one least significant bit, is added, if the word in memory is to be decreased, and "zero" if the word is to be increased. This successive trimming of each word during the remaining sixteen (i.e., fields 11 through 26) fields averages out the effects of excessively large noise peaks occurring during the binary successive approximation of fields 2 through 10. During any of the fields of 2 through 26, every word in the memory being set up is added to a word generated by word generator 1819. The word being generated by A/D word generator 1819 is determined in accordance with the algorithm shown in FIG. 19. This word is based on whether the output of the comparator 1812, which indicates whether the current value of the video signal corrected by the word location currently being modified, is high or low with respect to the reference voltage from circuit 1813.

Referring back to FIG. 15, the basic function of the 3-word delay 1521 can now be better understood. The basic function is to ensure that the delay from the input of the 3-bit shift register 1507 through to the X interpolation units 1514, 1517, 1518, 1516 D/A converter 1517a, buffer circuit 1518a into the video path, and through the adaptive filter of video output circuit 1107 into the integrator 1810 and the A/D comparator 1812, followed by word generator 1819, to the A/D adder 1522, is matched by delay 1521, so that the A/D word generated by word generator 1819 coincides at its input to the A/D adder 1522 with the word entering from the 3-word delay 1521.

Additional provisions must be made because of the effect of this 3-word delay. The need for these provisions arise because the main memory 1501 outputs words only during transfer lines such as lines 1610 and 1623 of FIG. 16. Thus, at the input to the 3-bit shift register 1507, the data words are present only during transfer lines. Furthermore, because of the delay when these words are present at the input to the 3-bit shift register 1507, they do, in fact, correspond physically to points which are 3 words later than the point being scanned at the instant that the words are present at the input to the 3-bit shift register 1507. Thus, words occurring at the end of a transfer line in fact correspond to points which may occur at the beginning of the next line which is not a transfer line. It is the purpose of the temporary delay 1521, in conjunction with line loop 1540, feeding data selector 1520, to ensure, that even though data is not present at the input to the 3-bit shift register 1507, when the points are scanned, these points are still presented to the A/D adder 1522 at input A.

Thus, the additional words are stored in the 3-bit delay 1521 and circulated in the delay during the first 3 words of the line following the transfer line. Consequently, these first three words pass through the 27 bit transfer line twice; once around the loop and through the A/D adder 1522 during which the word generated by A/D 1819 is presented in at input B; and once straight through the A/D added 1522, during which time zero is present on the adder 1522, to enter the main memory 1501.

It is claimed:

1. An image analysis and, optical and detection system for analyzing a field of view to produce optical characteristic data, comprising:
   scanning means for line scanning such field of view to produce a video signal having analog values representative of optical characteristic data;
   conversion means for converting the video signal analog values corresponding to discrete points along the scan line to discrete digital data having values which are a function of video signal analog values corresponding to such points; and
   memory means for storing image analysis optical characteristic data corresponding to digital data including means for automatically compensating for the response characteristics of the optical and detection system and for generating in response to the discrete digital data an output as a function of the stored optical characteristic data corresponding to the received discrete digital data to produce optical characteristic data.

2. An image analysis system for analyzing a field of view containing a feature or features to produce optical characteristic data of an analyzed feature or features, comprising:
   scanning means for line scanning such field of view to produce a video signal having analog values representative of optical characteristic data;
   conversion means for converting the video signal analog values corresponding to discrete points along the scan line to discrete digital data having values which are a function of video signal analog values corresponding to such points; and
   memory means for storing image analysis optical characteristic data corresponding to digital data including means for automatically compensating for characteristics imposed when generating the video signal and for generating in response to the discrete digital data an output as a function of the stored optical characteristic data corresponding to the received discrete digital data to produce optical characteristic data of such analyzed feature or features.

3. The image analysis system as defined in claim 2, wherein the conversion means generates discrete digital data having values proportional to the amplitude value of the analog video signal at the corresponding discrete points along the scan line.

4. The image analysis system as defined in claim 2, further including:
   processing means receiving the generated optical characteristic data for arithmetically processing such data to generate feature related optical characteristic data.

5. The image analysis system as defined in claim 4, further including detection means for generating data representative of the feature or features in the field of view of the image analysis system.

6. The image analysis system as defined in claim 5, wherein the detection means generates data as a function of the boundary of the feature or features in the field of view of the image analysis system.

7. The image analysis system as defined in claim 6, wherein the processing means receives the system feature data from the detection means and the output optical characteristic data from the memory means to process the collective data to produce data representative of the feature or features.

8. An image analysis system for analyzing a field of view containing a feature or features to produce optical characteristic data of such feature or features, comprising:
   scanning means for line scanning such field of view to produce a video signal having analog values representative of optical characteristic data;
   conversion means for converting the video signal analog values corresponding to discrete points along the scan line to discrete digital data having values which are a function of video signal analog values corresponding to such points;
   memory means for storing image analysis optical characteristic data corresponding to digital data and for generating in response to the discrete digital data an output as a function of the stored optical characteristic data corresponding to the received discrete digital data to produce optical characteristic data of such feature or features;
   optical characteristic data storage means for storing optical characteristic data corresponding to specific types of analyses to be performed and to the discrete points along the scan lines; and
   transfer means for transferring the stored data from the storage means to the memory means as a function of the analyses to be performed.

9. An image analysis system for analyzing a field of view containing a feature or features to produce optical characteristic data of such feature or features, comprising:
   scanning means for line scanning such field of view to produce a video signal having analog values representative of optical characteristic data;
   conversion means for converting the video signal analog values corresponding to discrete points along the scan line to discrete digital data having values which are a function of video signal analog values corresponding to such points;
   memory means for storing image analysis optical characteristic data corresponding to digital data and for generating in response to the discrete digital data an output as a function of the stored optical characteristic data corresponding to the received discrete digital data to produce optical characteristic data of such feature or features; and
   processing means receiving the generated optical characteristic data for arithmetically processing such data to generate feature related optical characteristic data, wherein the processing means includes a summation means for continually summing during a defined area of scan the discrete digital data from the memory means to provide an optical characteristic data summed over the defined area.

10. The image analysis system as defined in claim 9, further including detection means for generating data representative of the feature or features in the field of view and wherein the processing means includes a register for storing data compiled from the feature or features within the field of view and wherein the summation means additionally sums output data from the register to provide within the register at the completion of a field of view data representative of the density value of the feature or features within the field of view.

11. An image analysis system for analyzing a field of view containing a feature or features to produce optical characteristic data of such feature or features, comprising:

scanning means for line scanning such field of view to produce a video signal having analog values representative of optical characteristic data;

conversion means for converting the video signal analog values corresponding to discrete points along the scan line to discrete digital data having values which are a function of video signal analog values corresponding to such points;

memory means for storing image analysis optical characteristic data corresponding to digital data and for generating in response to the discrete digital data an output as a function of the stored optical characteristic data corresponding to the received discrete digital data to produce optical characteristic data of such feature or features; and processing means receiving the generated optical characteristic data for arithmetically processing such data to generate feature related optical characteristic data, wherein the processing means includes an output register and a comparator for receiving output data from the output register and the data from the memory means to provide an input to the output register as a function of the comparison of such data from the register and the memory means during a defined area of scan to provide output data at the output register as a function of the peak value of the optical characteristic data over the defined area.

12. The image analysis system as defined in claim 11, further including detection means for generating data representative of the feature or features in the field of view and wherein the processing means includes a loading register for storing data from the detection means compiled from the feature or features within the field of view and output data from the memory means corresponding to stored optical characteristic data and wherein the output register receives data from the loading register and wherein the comparator receives data from the output register and the loading register to provide an input to the output register as a function of the comparison of such data from the registers to provide output data at the output register as a function of the peak density or transmittance of the feature or features in the field of view.

13. An image analysis system for analyzing a field of view containing a feature or features to produce optical characteristic data of such feature or features, comprising:

scanning means for line scanning such field of view to produce a video signal having analog values representative of optical characteristic data;

conversion means for converting the video signal analog values corresponding to discrete points along the scan line to discrete digital data having values which are a function of video signal analog values corresponding to such points;

memory means for storing image analysis optical characteristic data corresponding to digital data and for generating in response to the discrete digital data an output as a function of the stored optical characteristic data corresponding to the received discrete digital data to produce optical characteristic data of such feature or features; and glare correction means for adjusting, as a function of scattered light within the image analysis system, the value of the video signal to be converted by the conversion means.

14. The image analysis system as defined in claim 13, wherein the glare corresponding means includes integrating means for integrating the video signal to produce an integrated signal having as its value the average white level of the video signal and multiplication means for multiplying the integrated signal by a predetermined value to provide a glare corresponding signal and summing means for combining the glare corresponding signal with the video signal to adjust the value of the video signal to provide a glare corrected video signal.

15. The image analysis system as defined in claim 14, wherein the multiplication means multiplies the integrated signal by a predetermined value which is a function of the percentage of a white intensity level within the field of view.

16. The image analysis system as defined in claim 15, wherein the predetermined value for multiplying the integrated signal has a value range from 0 to 0.1.

17. The image analysis system as defined in claim 13, further including shading corrector means for adjusting the value of the video signal as a function of black and white shading factors influencing the value of the video signal produced by the scanning means.

18. A method of analyzing a field of view in an image analysis and optical system containing a feature or features to produce optical characteristic data as a function of a detected feature or features, comprising the steps of:

scanning the field of view line-by-line to generate a video signal having analog values representative of optical characteristic data corresponding to the field of view;

converting the video signal analog values corresponding to discrete points along the scan line to discrete digital data having values which are a function of video signal analog values corresponding to such points;

storing in discrete addressed locations in a memory means different values of the optical system response characteristic data corresponding to discrete digital data; and generating in response to the discrete digital data addressing specific locations in the memory means an output from the memory means as a function of the stored characteristic data corresponding to the received discrete digital data to produce optical characteristic data as a function of such feature or features.

19. The method of analyzing in an image analysis system as defined in claim 18, further including the step of:

arithmetically processing the generated output optical characteristic data to produce feature related optical characteristic data.

20. The method of analyzing in an image analysis system as defined in claim 19, further including the step of:

generating detection data representative of the feature or features in the field of view of the image analysis system.

21. The method of analyzing in an image analysis system as defined in claim 20, further including the step of:

arithmetically processing the generated output optical characteristic data and the generated detection data representative of the feature or features to generate as a function thereof optical characteristic data related solely to the feature or features.

* * * * *